(12) United States Patent
Bai et al.

(10) Patent No.: US 12,495,434 B2
(45) Date of Patent: Dec. 9, 2025

(54) CONDITIONS FOR AUTONOMOUSLY UPDATING A TRANSMISSION CONFIGURATION INDICATOR (TCI) STATE

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 1093 days.

(21) Appl. No.: 17/500,849

(22) Filed: Oct. 13, 2021

(65) Prior Publication Data

US 2022/0124739 A1    Apr. 21, 2022

Related U.S. Application Data

(60) Provisional application No. 63/092,476, filed on Oct. 15, 2020, provisional application No. 63/092,471, filed on Oct. 15, 2020.

(51) Int. Cl.
*H04W 72/12* (2023.01)
*H04L 5/00* (2006.01)
(Continued)

(52) U.S. Cl.
CPC ......... *H04W 72/542* (2023.01); *H04L 5/0051* (2013.01); *H04L 5/0053* (2013.01); *H04W 72/1273* (2013.01)

(58) Field of Classification Search
CPC ............. H04W 72/1273; H04L 5/0053; H04L 5/0055; H04L 1/1812
See application file for complete search history.

(56) References Cited

U.S. PATENT DOCUMENTS

2022/0287020 A1* 9/2022 Park ................... H04B 7/0695
2023/0155660 A1* 5/2023 Zhang ................ H04B 7/0404
375/267
(Continued)

FOREIGN PATENT DOCUMENTS

EP           3624532 A1    3/2020
WO    WO-2021063393 A1 *  4/2021

OTHER PUBLICATIONS

International Search Report and Written Opinion—PCT/US2021/055053—ISA/EPO—Mar. 7, 2022.
(Continued)

*Primary Examiner* — Romani Ohri
(74) *Attorney, Agent, or Firm* — QUALCOMM Incorporated

(57) ABSTRACT

In some aspects, a user equipment (UE) receives scheduling information that schedules a channel state information reference signal (CSI-RS). The UE determines whether to autonomously update a transmission configuration indicator (TCI) state in response to the scheduled CSI-RS based, for example, on CSI-RS power metrics or payload size of a CSI report. Then, depending upon the determination, the UE either autonomously updates the TCI state or updates the TCI state only in response to TCI state update instructions received from the base station. In other aspects, a UE receives scheduling information from a multiple transmission and reception point (mTRP) base station that schedules a CSI-RS. The UE autonomously updates TCI states for use with the mTRP base station. Complementary operations may be performed by the base station. These and other aspects described herein may reduce latency and improve performance between a UE and a base station.

20 Claims, 32 Drawing Sheets

(51) Int. Cl.
*H04W 72/1273* (2023.01)
*H04W 72/542* (2023.01)

(56) References Cited

U.S. PATENT DOCUMENTS

2023/0189320 A1* 6/2023 Matsumura ........... H04L 5/0053
370/329
2024/0015759 A1* 1/2024 Koskela ............... H04B 7/0695

OTHER PUBLICATIONS

Mediatek Inc: "Discussion on CSI-RS Configuration Update for CQI Reporting and Active Spatial Relation Switch", 3GPP Draft, 3GPP TSG-RAN WG4 Meeting #93, R4-1913316, 3rd Generation Partnership Project (3GPP), Mobile Competence Centre, 650, Route Des Lucioles, F-06921 Sophia-Antipolis Cedex, France, vol. RAN WG4, No. Reno, Nevada, USA, Nov. 18, 2019-Nov. 22, 2019, Nov. 8, 2019 (Nov. 8, 2019), XP051817933, 8 Pages, Retrieved from the Internet: URL: https://ftp.3gpp.org/tsg_ran/WG4_Radio/TSGR4_93/Docs/R4-1913316.zip R4-1913316, Discussion on CSI-RS Configuration Update for CQI Reporting and Spatial Relation Switch. docx, [Retrieved on Nov. 8, 2019] Section 2.

* cited by examiner

900 ⟶

902
Determine whether to autonomously update a TCI state by comparing a size of a payload of a CSI report generated by the UE to a size threshold

904 Threshold exceeded?
- No → 
- Yes ↓

906
Update the TCI state autonomously and transmit report to base station

908
Update the TCI state only in response to TCI state update instructions received from the base station

Generate a CSI report to report the TCI that includes an indication of the TCI state and an associated measured metric, where (1) the CSI report further includes an indication for each TCI state in the report indicating whether the TCI state is updated by the UE, (2) the autonomous TCI state update is reported by replacing a top K number of TCI states in a CSI report that is not currently configured with corresponding updated TCI states, (3) the autonomous update is reported by replacing TCI states that are not currently configured and are among a top K number of TCI states in the CSI report with corresponding updated TCI states

1304

Transmit the CSI report to the base station

FIG. 13

10. CONDITIONS FOR AUTONOMOUSLY UPDATING A TRANSMISSION CONFIGURATION INDICATOR (TCI) STATE

CROSS-REFERENCE TO RELATED APPLICATIONS

The present application for patent claims priority to Provisional Application Ser. No. 63/092,471, titled "CONDITIONS FOR AUTONOMOUSLY UPDATING A TRANSMISSION CONFIGURATION INDICATOR (TCI) STATE," filed Oct. 15, 2020, and claims priority to Provisional Application Ser. No. 63/092,476, titled "AUTONOMOUS UPDATES OF A TRANSMISSION CONFIGURATION INDICATOR (TCI) STATE FOR USE WITH A MULTIPLE TRANSMISSION AND RECEPTION POINT (MTRP)," also filed Oct. 15, 2020, both of which are assigned to the assignee hereof and both of which are hereby expressly incorporated by reference herein as if fully set forth below and for all applicable purposes.

FIELD OF THE DISCLOSURE

The present disclosure relates generally to communication systems, and more particularly, to updating Transmission Configuration Indicator (TCI) states, including updates for use with multiple transmission and reception points (mTRPs).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a summary of one or more aspects of the present disclosure, in order to provide a basic understanding of such aspects. This summary is not an extensive overview of all contemplated features of the disclosure, and is not intended to either identify key or critical elements of any or all aspects of the disclosure or delineate the scope of any or all aspects of the disclosure. Its purpose is to present some concepts of one or more aspects of the disclosure in a form as a prelude to the more detailed description that is presented later.

In one aspect of the disclosure, an apparatus is provided for wireless communication. The apparatus comprises: a memory; and at least one processor coupled to the memory. The at least one processor is configured to: receive scheduling information that schedules a Channel State Information Reference Signal (CSI-RS) from a base station; determine whether to autonomously update a Transmission Configuration Indicator (TCI) state in response to the scheduled CSI-RS; update the TCI state autonomously in response to a determination to autonomously update the TCI state; and update the TCI state only in response to TCI state update instructions received from the base station following a determination not to autonomously update the TCI state.

In another aspect of the disclosure, a method is provided for wireless communication at a UE. The method includes: receiving scheduling information from a base station that schedules a CSI-RS; determining whether to autonomously update a TCI state in response to the scheduled CSI-RS; in response to a determination to autonomously update the TCI state, updating the TCI state autonomously; and in response to a determination not to autonomously update the TCI state, updating the TCI state only in response to TCI state update instructions received from the base station.

In another aspect of the disclosure, an apparatus is provided for wireless communication. The apparatus includes: a memory; and at least one processor coupled to the memory. The at least one processor is configured to: transmit scheduling information that schedules a CSI-RS to a user equipment UE; receive an autonomously updated TCI state from the UE if the apparatus permits the UE to autonomously update the TCI state; and transmit TCI state update instructions to the UE if the apparatus does not permit the UE to autonomously update the TCI state.

In yet another aspect of the disclosure, an apparatus is provided for wireless communication. The apparatus incudes a memory; and at least one processor coupled to the memory. The processor is configured to: receive scheduling information that schedules a CSI-RS from a multiple transmission and reception point (mTRP) base station; and autonomously update Transmission Configuration Indicator (TCI) states for use with the mTRP base station.

These and other aspects of the disclosure will become more fully understood upon a review of the detailed description, which follows. Other aspects, features, and embodiments of the present disclosure will become apparent to those of ordinary skill in the art, upon reviewing the following description of specific, exemplary embodiments in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 9 illustrates a procedure that may be performed by a UE to determine whether to perform an autonomous TCI state update based on a channel state information (CSI) report payload size.

FIG. 13 illustrates a procedure that may be performed by a UE to report an autonomously updated TCI state.

DETAILED DESCRIPTION

Figure 1:
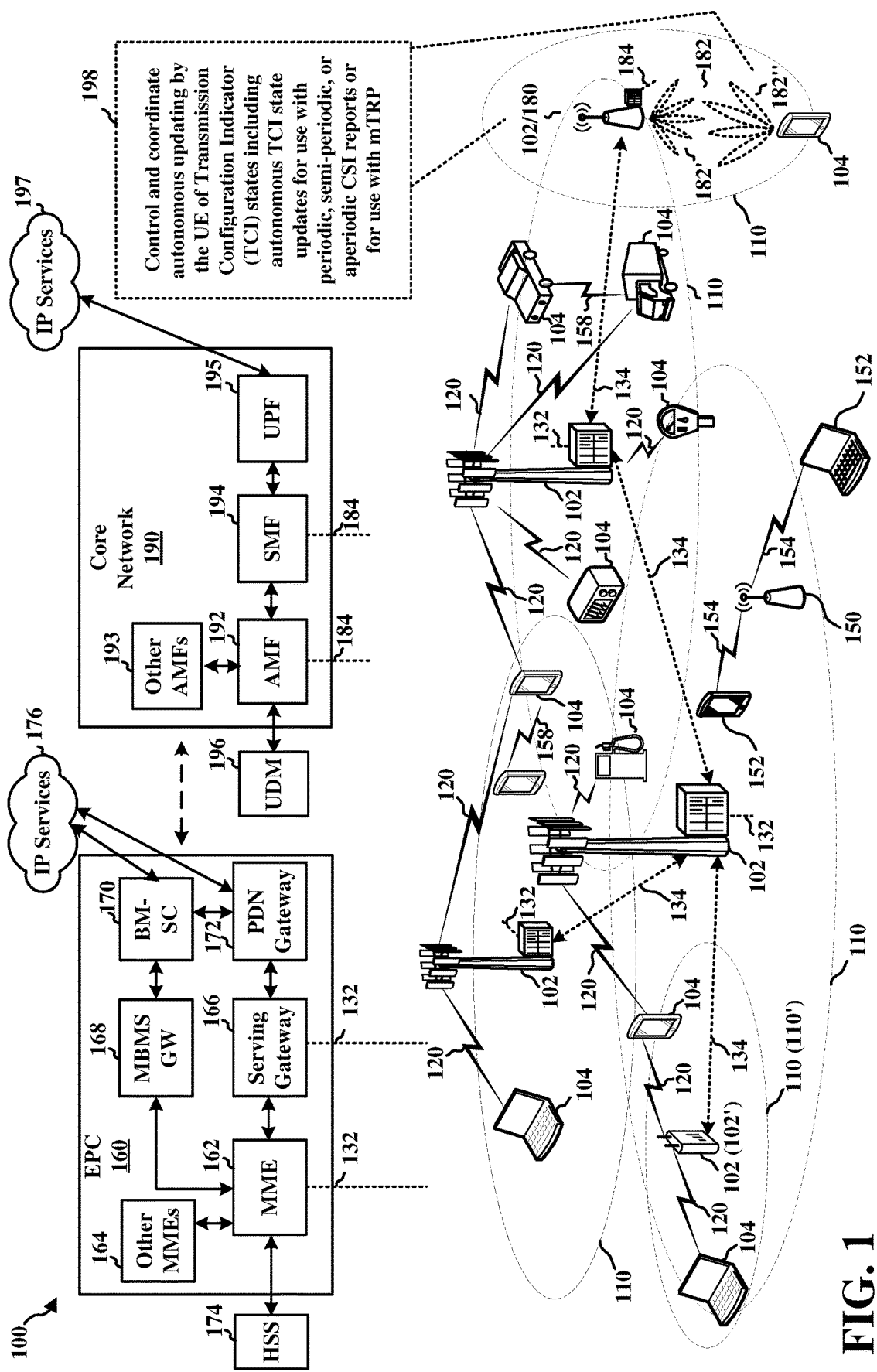
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. Base station 102 may be configured as a multiple transmit and receive point (mTRP) or multi-TRP base station.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., 51 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. Note that some base stations, such as exemplary base station 180 may be configured to provide multiple TRPs (e.g. the base station is an mTRP base station). The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and the base station 180 may be respectively configured to control and coordinate autonomous updating by the UE of Transmission Configuration Indicator (TCI) states including autonomous TCI state updates for use with P/SP/AP CSI reports. Although the following descriptions may focus on TCI states within 5G NR, the concepts described herein may be applicable to other similar areas, such as beam states for LTE, LTE-A, CDMA, GSM, and other wireless technologies.

Figure 2:
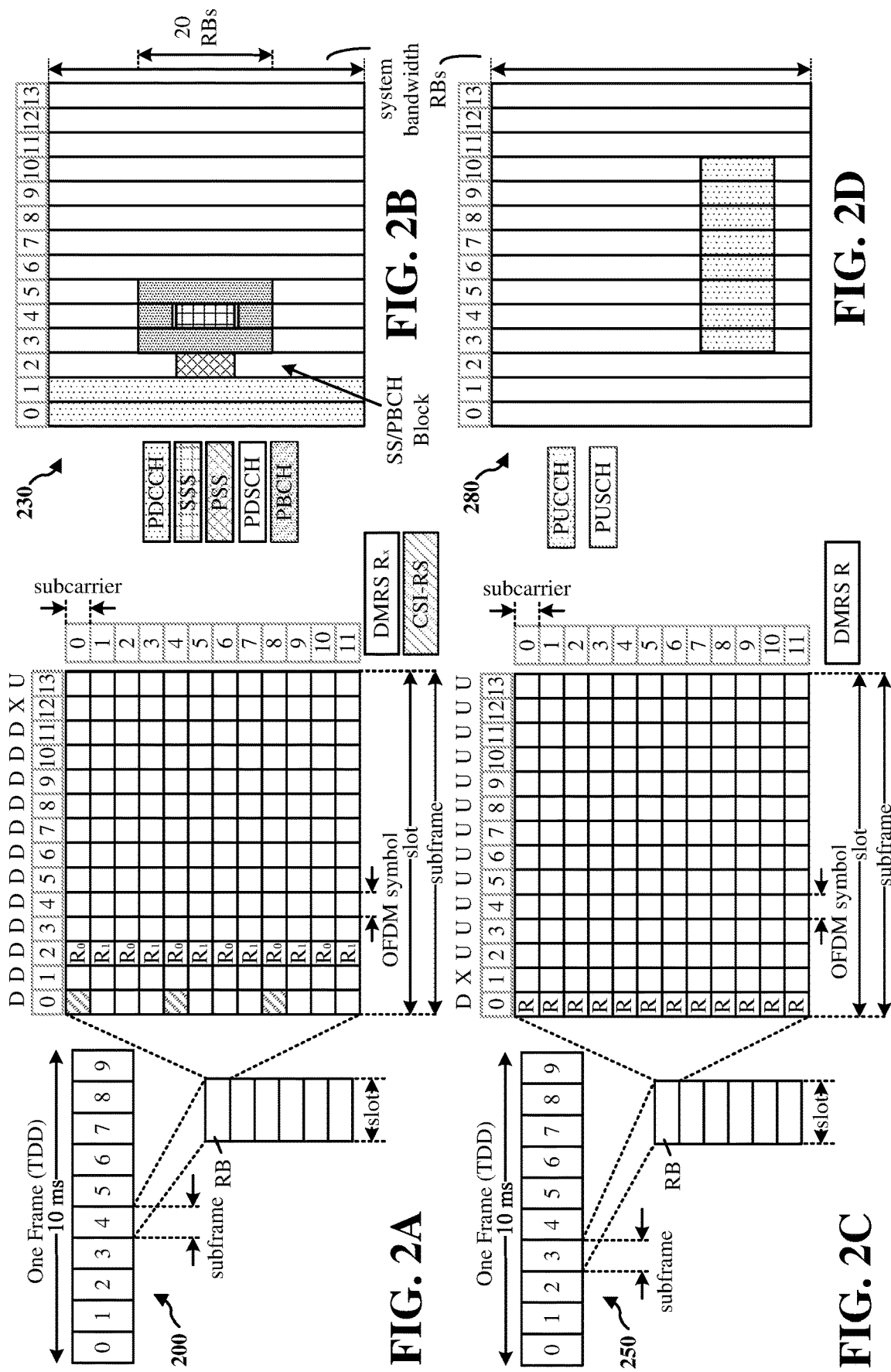
FIGS. 2A, 2B, 2C, and 2D are diagrams illustrating examples of a first 5G/NR frame, DL channels within a 5G/NR subframe, a second 5G/NR frame, and uplink (UL) channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
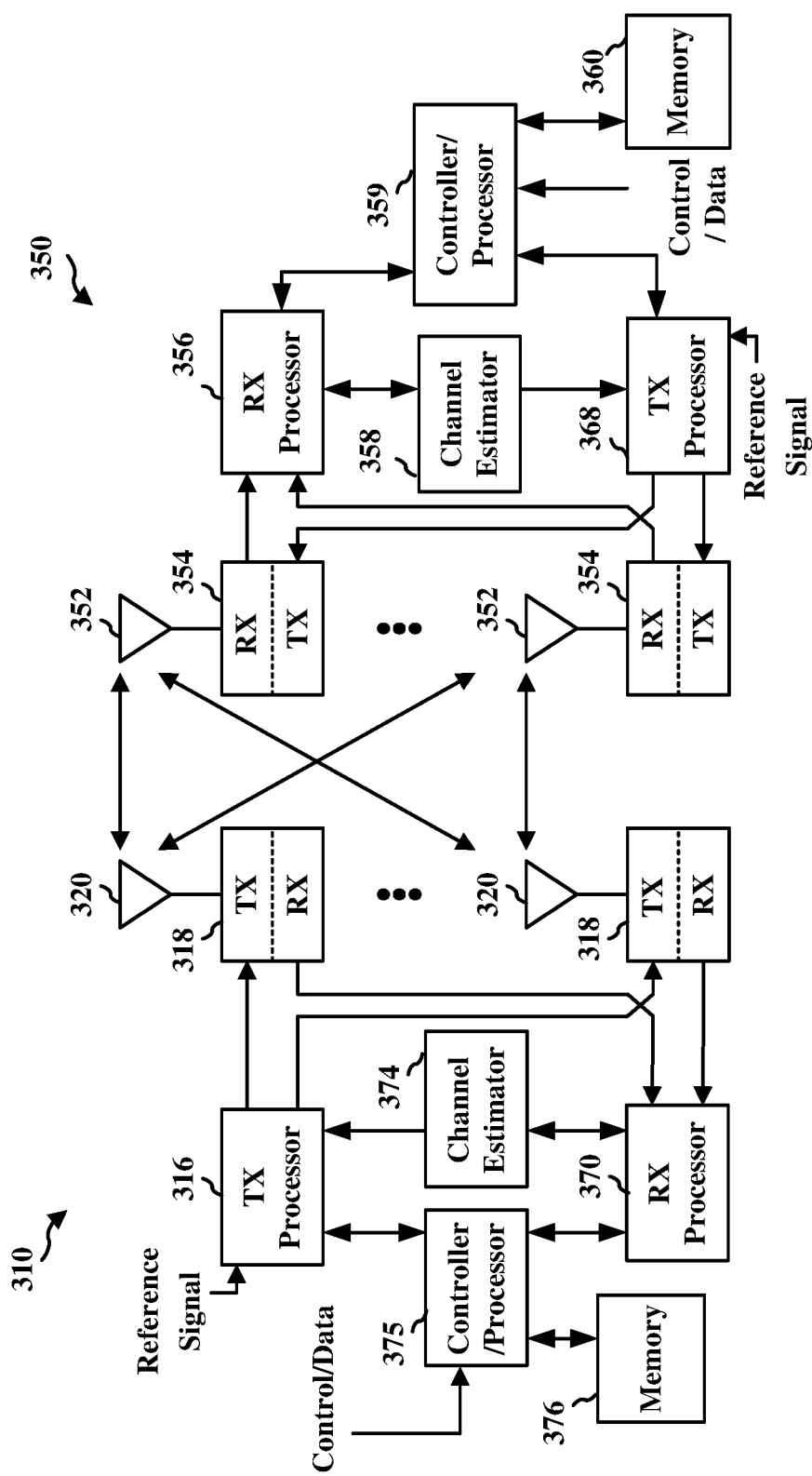
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Downlink beamforming is typically transparent to a UE. For example, when a transmitter (e.g., a base station) transmits a downlink signal to the UE using a particular beam, the UE may not need to know the particular beam used at the transmitter to receive the downlink signal. In some scenarios, to improve signal reception performance at the UE, a base station may indicate to the UE that a downlink signal (e.g., a PDCCH and/or a PDSCH signal) will use the same beam as a reference signal (e.g., CSI-RS or SS block) configured for the UE. In some examples, the beam indication may be based on one or more transmission configuration indication (TCI) states.

For example, each TCI state may include information about a reference signal (e.g., CSI-RS or SS block). The base station may associate an upcoming downlink signal transmission (e.g., a PDCCH or PDSCH signal transmission) with a certain TCI state and may indicate the TCI state to the UE. The UE may assume that the upcoming downlink signal transmission uses the same beam (e.g., the spatial filter) as the reference signal associated with that TCI state.

An example procedure between a base station and UE will now be described for changing a TCI state (also referred to as a TCI state configuration) for a downlink channel (e.g., PDCCH and/or PDSCH). The base station may schedule the UE to receive a CSI-RS on multiple candidate beams. For example, the CSI-RS may be an aperiodic CSI-RS (abbreviated herein as AP CSI-RS) triggered by DCI. The UE may perform a CSI-RS beam sweep to measure the reference signal received power (RSRP) of the CSI-RS for each candidate beam. The base station may configure the UE for a channel state information (CSI) report associated with the CSI-RS beam sweep and the UE may report the top K beams in terms of RSRP, where K represents a positive integer.

The base station may decide to replace one or more current downlink channel beams (e.g., one or more beams for PDCCH and/or PDSCH) with one or more candidate beams based on the CSI report. For example, the base station may transmit a medium access control (MAC) control element (CE) (abbreviated herein as MAC-CE) to the UE to update the TCI state for the downlink channel (e.g., PDCCH and/or PDSCH). The base station may schedule the downlink channel (e.g., PDSCH or PDCCH) using the updated TCI state on the replaced beams.

It should be understood that in some scenarios, the base station may determine not to update a TCI state for a downlink channel after receiving a CSI report associated with a CSI-RS beam sweep. In other words, a CSI-RS beam sweep and a CSI report may not always be followed by a TCI state update.

In some examples, to reduce latency, a UE may autonomously update a TCI state for a downlink channel (e.g., PDSCH and/or PDSCH) when an AP CSI-RS is scheduled for a CSI report. An example procedure for autonomously updating a TCI state at a UE will now be described. A base station may schedule the UE to receive an AP CSI-RS on multiple candidate beams and the UE may measure the RSRP of the AP CSI-RS for each beam. The base station may configure the UE for a CSI report associated with an AP CSI-RS beam sweep and the UE may report the top K beams in terms of RSRP, where K represents a positive integer. The UE may autonomously update the TCI state for a downlink channel (e.g., PDCCH and/or PDSCH) based on the CSI-RS. The base station may schedule the downlink channel (e.g., PDCCH and/or PDSCH) using the updated TCI state on the replaced beams. This procedure can save signaling overhead by avoiding one or more MAC-CE transmissions to update the TCI state configuration for the downlink channel.

It should be understood that in some scenarios, the UE may determine not to autonomously update a TCI state for a downlink channel after performing an AP CSI-RS beam sweep. Therefore, a base station may not know when to expect an autonomous TCI state update at the UE.

To overcome these issues, the aspects described herein may enable a UE to apply one or more conditions and/or rules for autonomously updating a TCI state for a downlink channel. The one or more conditions and/or rules may allow a base station to determine when an autonomous update of a TCI state at the UE is expected to occur. In some examples, the one or more conditions and/or rules may enable a UE to control or coordinate autonomous updates of a TCI state based on one or more of base station configuration parameters, reference signal (RS) measurement results, a payload size of a CSI report, reception of an acknowledgement (ACK) for the CSI report at the UE, and a type of CSI-RS or a type of the CSI report. A UE may use the aspects described herein with a periodic (P) CSI-RS or a semi-persistent (SP) CSI-RS and with a periodic (P) CSI report, a semi-persistent (SP) CSI report, or an aperiodic (AP) CSI report.

In some aspects, autonomous updates of TCI states at a UE may be controlled and coordinated based on configuration parameters from a base station by (1) indicating in a CSI-RS configuration (e.g., in an RRC message for CSI-RS for a beam sweep), whether an autonomous update using the beams associated with the CSI-RS is permitted and will be performed (e.g., for a periodic CSI-RS, a semi-persistent CSI-RS, or aperiodic CSI-RS); (2) indicating in a CSI report configuration whether an autonomous beam update is permitted and will be performed; and/or (3) indicating via dynamically signaling from the base station to the UE whether autonomous update is allowed for all CSI reports (e.g., in a DCI scheduling AP CSI report).

In some aspects, autonomous updates of TCI states at a UE may be controlled and coordinated based on reference signal (RS) measurement results. In some examples, the UE may determine whether a reported RSRP of a reported beam is larger than a threshold and, if so, the UE may autonomously update a TCI state. In some examples, the UE may determine whether the reported RSRP is X dB better than a current downlink data channel (e.g., PDSCH) and, if so, the UE may autonomously update a TCI state. In some examples, X may be a configurable parameter and may represent a number in units of decibels (dB).

The conditions and configuration parameters described herein may be configured by a base station or based on standards set forth in standards documents. In this regard, if the power margins are sufficiently large, TCI reports transmitted from a UE to the base station may be properly received at the base station and hence the base station will be informed of any autonomously updated TCI states at the UE. Otherwise, the TCI state update report may not be properly received at the base station and hence the base station may not be informed of any autonomously updated TCI states at the UE.

In some aspects, autonomous updates are controlled and coordinated based on the size of a payload of the CSI report from the UE. In some examples, the UE may determine if the payload is smaller than a configurable threshold and, if so, the UE may autonomously update a TCI state. In this regard, if the payload is sufficiently small, then it is very likely that the CSI report will be properly received at the base station and hence the base station will be informed of the autonomously updated TCI state. If the payload is large, the CSI report may not be properly received at the base station and hence the base station will not be informed of the autonomously updated TCI state. In such a case, it may be preferable that the UE does not autonomously update a TCI state (or uses another mechanism for reporting the update).

In some aspects, autonomous updates are controlled and coordinated based on whether an acknowledgement (ACK) for the CSI report is received by the UE by controlling the UE to apply an autonomously updated TCI state only after receiving an ACK for the CSI report. Moreover, in some examples, the UE waits a configurable period of time after receiving the ACK to autonomously update a TCI state. In some example implementations, the CSI report may be in a PUSCH and/or a PUCCH.

When the CSI report is transmitted in a PUSCH, the ACK may be a UL grant scheduling a new transmission using the same hybrid automatic repeat request (HARQ) identifier (ID) as the PUSCH carrying the CSI report. In this regard, it may be better that the UE does not perform an autonomous TCI state update since, if no ACK is received, there may be issues preventing proper communication between the base station and the UE. If an ACK is received, it may be useful for the UE to delay an autonomous update of a TCI state to allow for receipt of TCI instructions from the base station.

In some aspects, autonomous updates of TCI states are controlled and coordinated based on the type of CSI-RS (e.g., periodic CSI-RS, aperiodic CSI-RS, semi-persistent CSI-RS) or the type of CSI report (e.g., aperiodic CSI report, semi-persistent CSI report) by setting as a default that the base station is to expect an autonomous update of a TCI state when a CSI-RS or a CSI report is aperiodic or semi-persistent, and that no autonomous update of a TCI state is expected to occur when the CSI-RS is periodic.

Still further, mechanisms or procedures for actually reporting an update of a TCI state are disclosed herein. In some aspects, the UE may report up to K beams (corresponding to K TCI states) with RSRP. For a downlink channel (e.g., PDSCH and/or PDCCH), up to N TCI states can be configured in the list, where K N is expected. Some of the reported TCI states may already be configured for the downlink channel (e.g., PDSCH and/or PDCCH). Rules may be set to specify which beam to autonomously update from the report.

In one example, the UE replaces the top K TCI states in the CSI report that is not currently configured. In another example, the UE replaces the TCI states that are not currently configured and are among the top K TCI states in the report. Rules also may be set specifying which beam is to be replaced in a list of TCI states. In one example, if the UE is configured with fewer than N TCI states, then the UE first tries to append the reported qualified TCI states in the TCI state list. One the TCI list is full, the UE then replaces a current TCI state with the reported qualified TCI state based on a predefined rule, such as a rule specifying that the UE replace the current TCI state based on the order of its ID (also referred to as a TCI state ID). For example, the UE may replace a TCI state associated with a smallest TCI state ID (e.g., a TCI state ID number having the smallest value) first.

In some examples, each TCI state may be configured with a TCI state ID and quasi-colocation (QCL) information. The QCL information for a TCI state may include the source reference signal (RS) (e.g., CSI-RS) for the TCI state. An example TCI state configuration may be expressed in the Abstract Syntax Notation One (ASN.1) format as follows:

```
--ASN1START
--TAG-TCI-STATE-START
TCI-State : :=       SEQUENCE {
    tci-StateId         TCI-StateId,
    qcl-Type1           QCL-Info,
    qcl-Type2           QCL-Info
    ...
}
QCL-Info : : =       SEQUENCE {
    cell                ServCellIndex
    bwp-Id
    referenceSignal     CHOICE {
        csi-rs              NZP-CSI-RS-ResourceID,
        ssb                 SSB-Index
    },
    qcl-Type            ENUMERATED {typeA, typeB, typeC, typeD},
    ...
}
```

In some examples, a downlink channel configuration (e.g., a PDSCH configuration or a PDCCH configuration) may include a list of TCI states that may be used for the downlink channel. For example, if the list of TCI states is for PDSCH, the TCI states in the list can be used for PDSCH. In some examples, when scheduling CSI-RS, a TCI state may be indicated in the CSI-RS resource configuration.

In one example, a TCI state may be updated by replacing a TCI state ID in a PDSCH TCI state list with a TCI state ID associated with the reported CSI-RS resource. In another example, rather than changing a TCI state ID, the UE may revise the content of the TCI state configuration of the TCI state ID in a PDSCH TCI state list. For example, the UE may revise the reference signal (RS) in a QCL information block in the corresponding TCI state configuration to change it to the reported CSI-RS resource ID.

Figure 4:
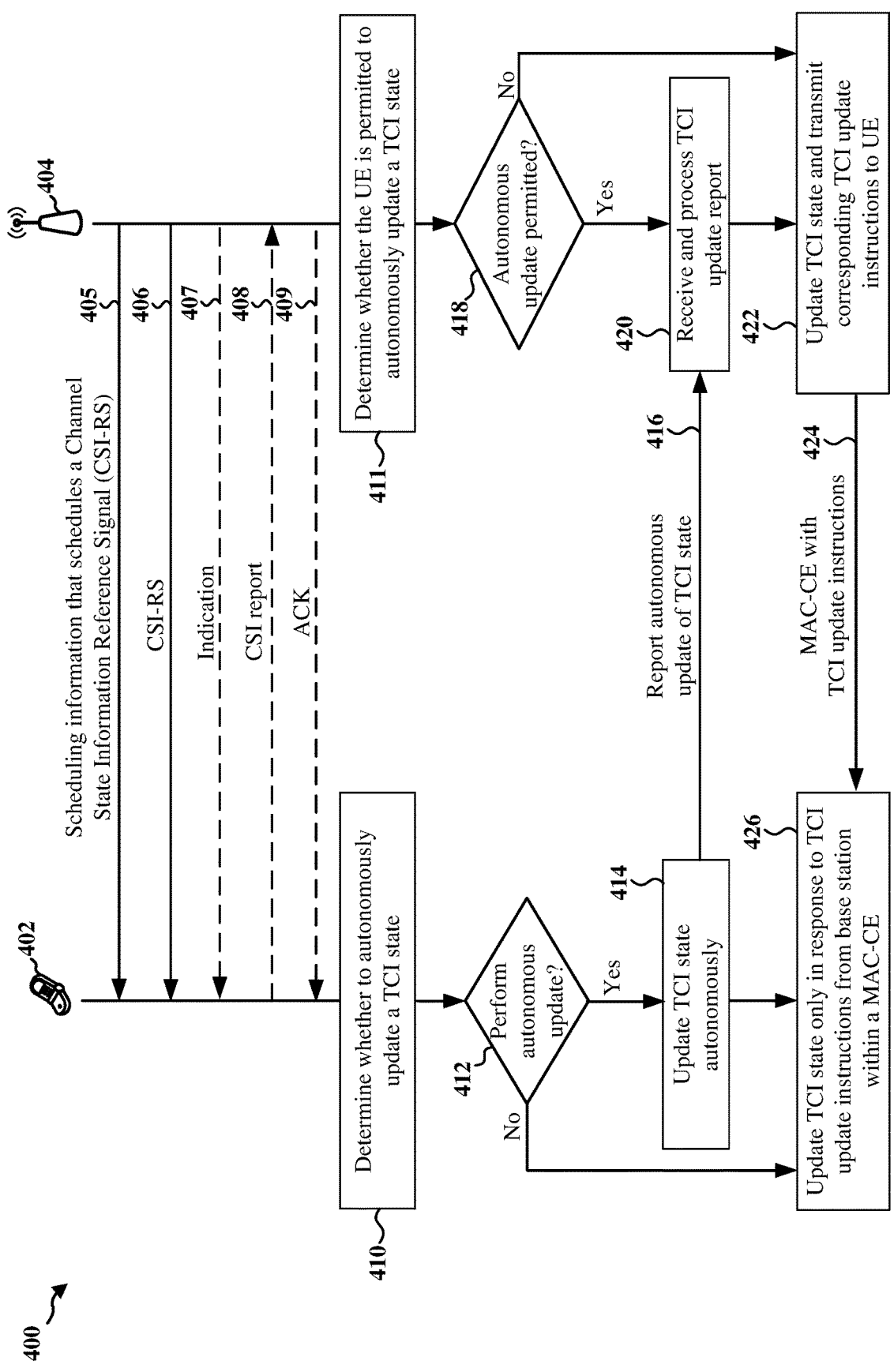
FIG. 4 provides an overview of a procedure that may be performed by a UE and a base station to control and coordinate autonomous transmission configuration indicator (TCI) updates.

FIG. 4 is a diagram 400 illustrating an example procedure to control and coordinate autonomous TCI state updates at a UE in accordance with various aspects of the present disclosure. As shown in FIG. 4, the base station 404 transmits scheduling information 405 that schedules a reference signal, such as a CSI-RS, for the UE 402. The scheduling information 405 may further schedule or configure a responsive CSI-RS report. The base station 404 may transmit the CSI-RS 406 to the UE 402.

In some example implementations, the base station 404 may optionally transmit an indication 407. The indication 407 may indicate that the UE 402 is permitted to autonomously update a TCI state and/or other suitable indications described herein may be transmitted. In some examples, the UE 402 may perform measurements (e.g., RSRP measurements) on the CSI-RS 406 and may optionally transmit a CSI report 408 to the base station 404. In some examples, the base station 404 may transmit an ACK 409 to the UE 402 if the CSI report 408 is successfully received at the base station 404.

At 410, the UE 402 determines whether to autonomously update a TCI state after transmission of the CSI report 408 and, at 411, the base station determines whether the UE 402 is permitted to autonomously update a TCI state after the CSI report 408. Operations 410 and 411 may be performed concurrently or, in some cases, at different times.

In some examples, the determination whether to autonomously update a TCI state at 410 may include an initial determination as to whether the UE 402 is permitted to autonomously update TCI states. That is, in some aspects, the UE 402 only autonomously updates the TCI state if the UE 402 first determines that it is permitted to do so. Then, whether the UE 402 actually updates the TCI state may depend on additional factors, such as a CSI report payload size, RSRP values, and/or other factors as described herein.

The determination at 410 and the determination at 411 may be based on a common set of predetermined rules or conditions, which may be preconfigured (e.g., programmed) at the UE 402 and at the base station 404. In some examples, such common set of predetermined rules or conditions may be specified in wireless communication standards (e.g., 3GPP standards) implemented at the UE 402 and the base station 404. In general, any of a wide variety of rules and/or conditions may be applied so long as the UE 402 and the base station 404 reach mutually consistent decisions. That is, the overall system may be configured so that both the UE 402 and the base station 404 reach the same initial determination of whether the UE 402 is permitted to perform an autonomous update of a TCI state. This may allow the base station 404 to be prepared to receive and process signal transmissions based on autonomously updated TCI states.

At decision 412, if the UE 402 decides to autonomously update a TCI state after a CSI report (e.g., the CSI report 408), the UE 402 at block 414 autonomously updates a TCI state and transmits a report or other indication 416 to the base station 404. The base station 404, after determining at block 418 that autonomous TCI state updates are permitted at the UE 402, receives and processes the autonomously updated TCI at block 420.

At decision 418, if the base station 404 determines that the UE 402 is not permitted to autonomously update a TCI state, the base station 404 at 422 updates the TCI state itself and transmits corresponding TCI state update instructions 424 to the UE 402. At 426, the UE 402 receives and processes the TCI state update instructions 424. That is, the UE 402 updates a TCI state based on the TCI state update instructions 424, which may be received from the base station 404 in a MAC-CE.

In this manner, the UE 402 and the base station 404 perform consistent and coordinated TCI state update operations based on a shared and predetermined set of conditions or rules, which may be set forth in wireless communication standards (e.g., 3GPP standards) and implemented at the UE 402 and the base station 404. Exemplary operations in accordance with various rules or conditions will now be described.

Figure 5:
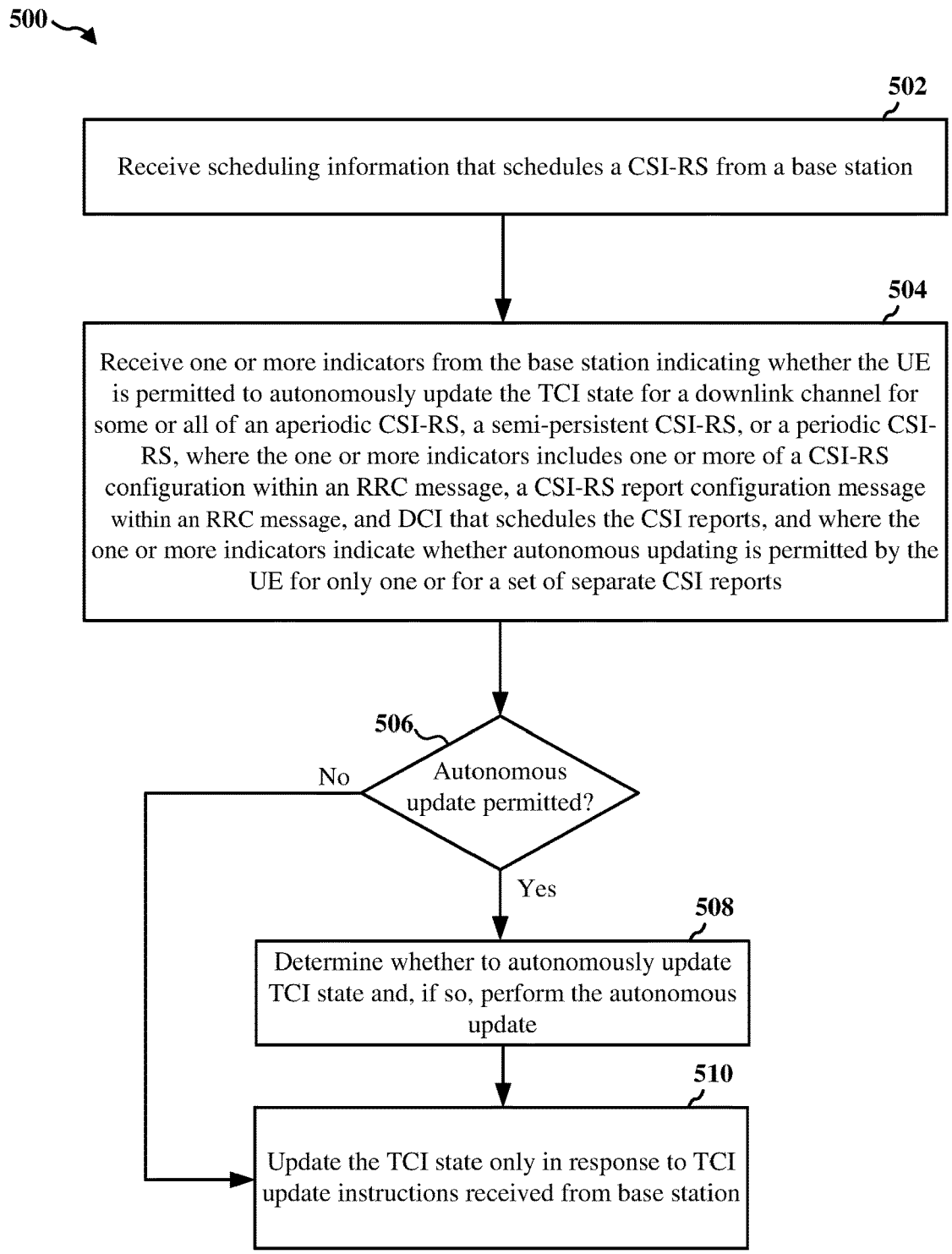
FIG. 5 illustrates a procedure that may be performed by a UE to determine whether the UE is permitted to autonomously update a TCI state.

FIG. 5 illustrates a procedure 500 that may be performed by a UE (e.g., UE 402) to determine whether the UE is permitted to autonomously update a TCI state. At 502, the UE receives scheduling information that schedules a CSI-RS from a base station (e.g., base station 404). At 504, the UE receives one or more indicators from the base station indicating whether the UE is permitted to autonomously update the TCI state for a downlink channel (e.g., PDSCH and/or PDSCH) for some or all of an aperiodic CSI-RS, a semi-persistent CSI-RS, or a periodic CSI-RS, where the one or more indicators includes one or more of a CSI-RS configuration within an RRC message, a CSI-RS report configuration message within an RRC message, and DCI that schedules the CSI reports, and where the one or more indicators indicate whether autonomous updating is permitted by the UE for only one or for a set (e.g., multiple) of separate CSI reports.

If autonomous updates of TCI states are permitted at the UE (e.g., at 506), the UE at 508 determines whether to autonomously update a TCI state and, if so, performs the autonomous update. The determination (e.g., at 508) whether to autonomously update a TCI state may be made based on a variety of measured values or preconfigured conditions, described elsewhere herein. If autonomous updates of TCI states are not permitted (e.g., at 506), the UE at 510 updates the TCI state only in response to TCI state update instructions received from the base station, as previously described.

Figure 6:
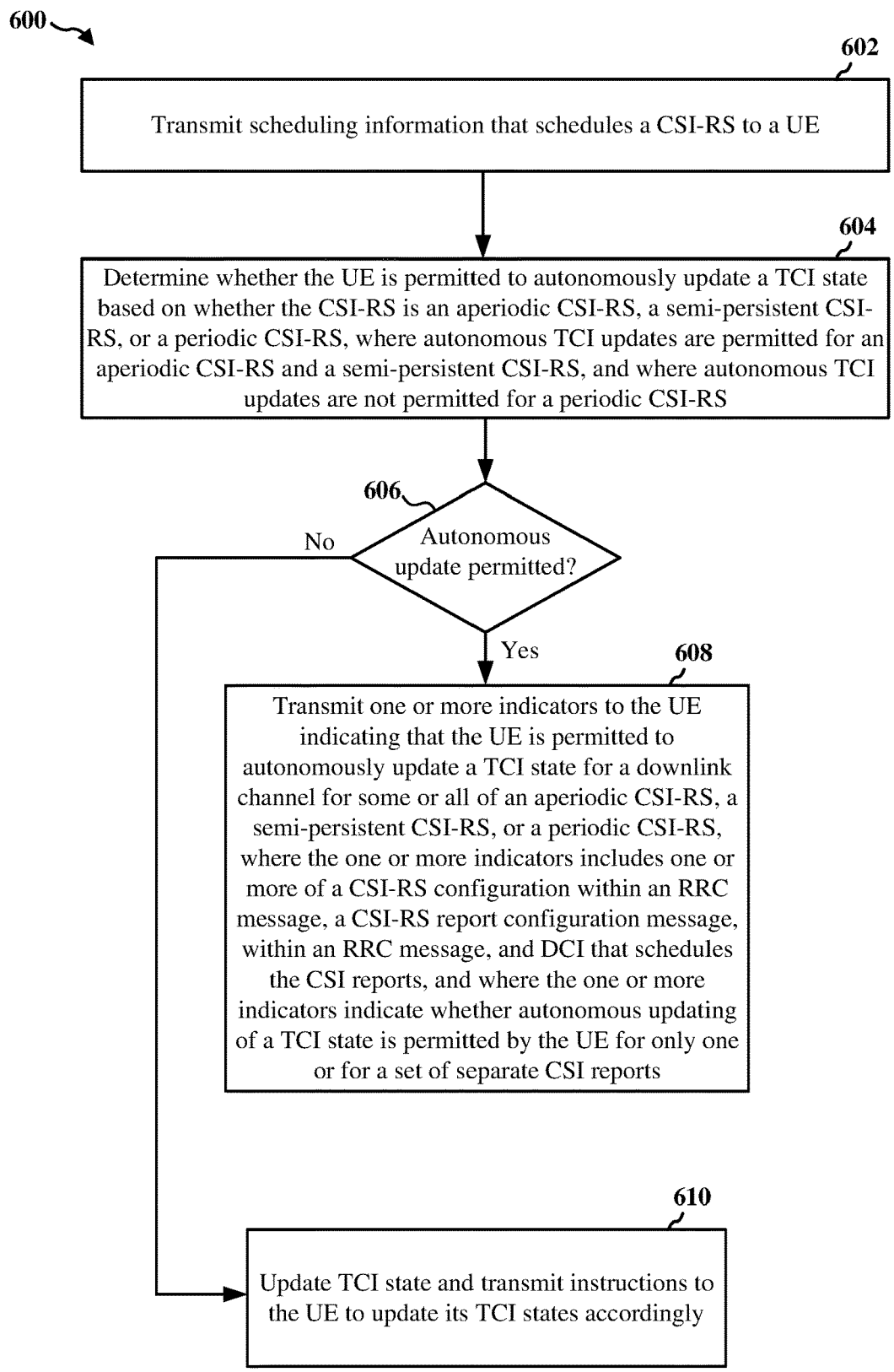
FIG. 6 illustrates a complementary procedure that may be performed by a base station to determine whether the UE is permitted to autonomously update a TCI state.

FIG. 6 illustrates a complementary procedure 600 to that of FIG. 5 that may be performed by a base station (e.g., base station 404). At 602, the base station transmits scheduling information that schedules a CSI-RS to the UE (e.g., UE 402). At 604, the base station determines whether the UE is permitted to autonomously update a TCI state. For example, in some particular wireless systems, UEs may be forbidden (based on preprogramming) to autonomously update TCI states, whereas in other wireless systems UEs are permitted to perform autonomous updates, at least under some conditions. As another example, as indicated in block 604, the UE may be permitted to perform an autonomous update based on whether the CSI-RS is an aperiodic CSI-RS, a semi-persistent CSI-RS, or a periodic CSI-RS, where autonomous TCI state updates are permitted for an aperiodic CSI-RS and a semi-persistent CSI-RS, and where autonomous TCI state updates are not permitted for a periodic CSI-RS.

If autonomous updates are permitted (e.g., at 606), then at 608, the base station transmits one or more indicator(s) to the UE indicating that the UE is permitted to autonomously update the TCI state for a downlink channel (e.g., PDSCH and/or PDSCH) for some or all of an aperiodic CSI-RS, a semi-persistent CSI-RS, or a periodic CSI-RS, where the one or more indicators includes one or more of a CSI-RS configuration within an RRC message, a CSI-RS report configuration message within an RRC message, and DCI that schedules the CSI reports, and where the one or more indicators indicate whether autonomous updating of a TCI state is permitted by the UE for only one or for a set (e.g., multiple) of separate CSI reports. On the other hand, if autonomous updates are not permitted (e.g., at 606), then at 610, the base station updates the TCI state and transmits instructions to the UE to update its TCI states accordingly.

Figure 7:
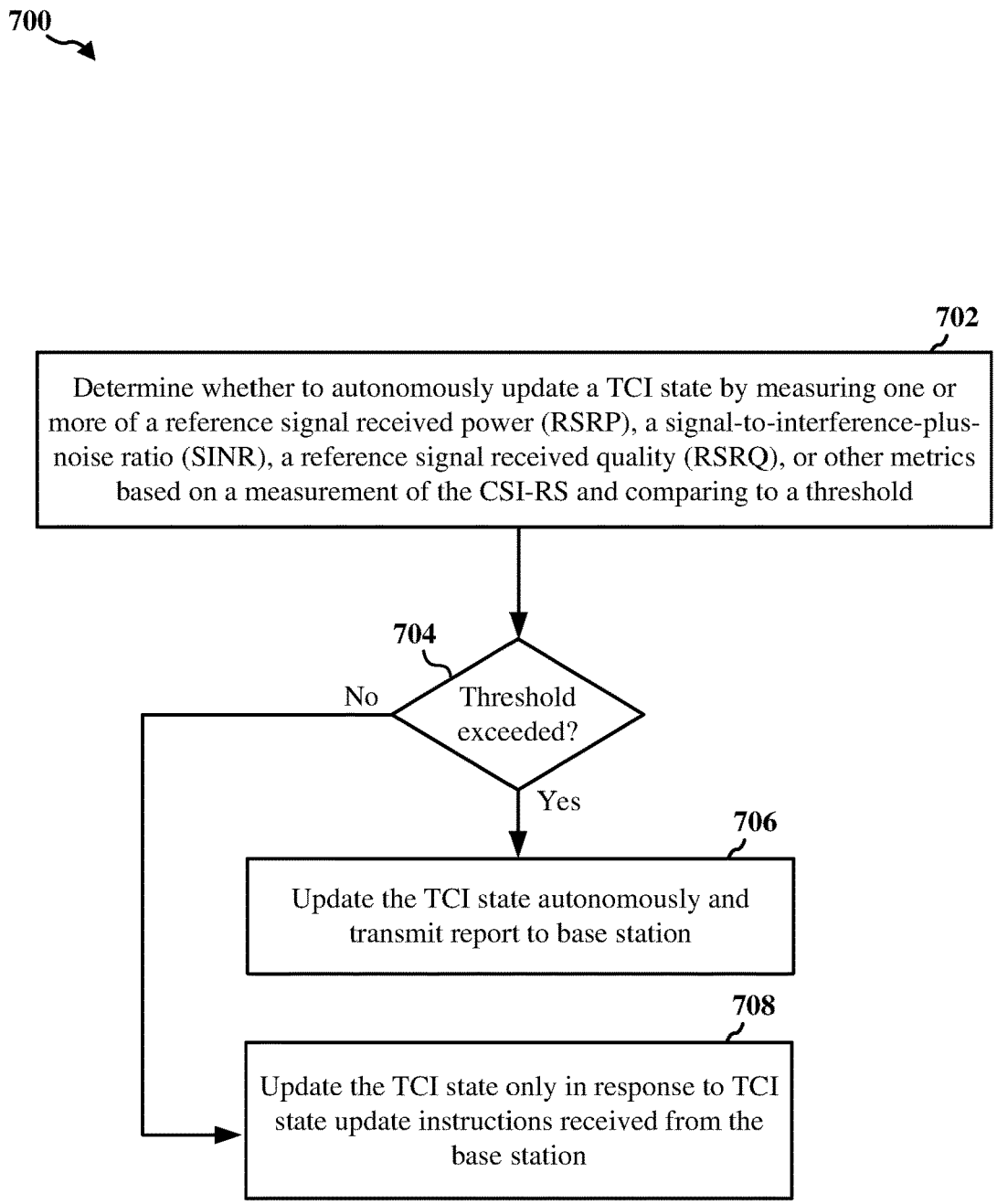
FIG. 7 illustrates a procedure that may be performed by a UE to determine whether the UE is permitted to autonomously update a TCI state based on power metrics

FIG. 7 illustrates a procedure 700 that may be performed by a UE (e.g., UE 402) to determine whether the UE is permitted to autonomously update a TCI state based on, for example, power metrics. The procedure is performed only if the UE is permitted to perform autonomous updates, as previously discussed.

At 702, the UE determines whether to autonomously update a TCI state by measuring one or more of a reference signal received power (RSRP), a signal-to-interference-plus-noise ratio (SINR), a reference signal received quality (RSRQ), or other metrics based on a measurement of the CSI-RS and comparing to a threshold. For example, the UE may compare the measured metric to a configurable first power threshold, or may compare a difference (also referred to as a power difference value) between the measured metric and a current PDSCH power level to a configurable second power threshold (e.g., a threshold set to X db above the current PDSCH power level). The second power threshold may be referred to as a power difference threshold.

If the UE determines (e.g., at 704) that the applicable threshold is exceeded (e.g. the measured metric exceeds the first power threshold or the power difference value exceeds the second power threshold), then at 706, the UE updates the TCI state autonomously and transmits a report to the base station. Exemplary procedures for performing the TCI state update are described below. Otherwise, at 708, the UE updates the TCI state only in response to TCI state update instructions received from the base station, as previously described.

As described herein, if the power margins are sufficiently large, then it is very likely that a report (e.g., a CSI report indicating an autonomous TCI state update) transmitted from the UE to the base station will be properly received at the base station and hence the base station will be informed of the autonomous TCI state update. Otherwise, the report may not be properly received at the base station and hence the base station will not be informed of the autonomous update. In such case, it may be better that the UE does not perform an autonomous TCI state update.

Figure 8:
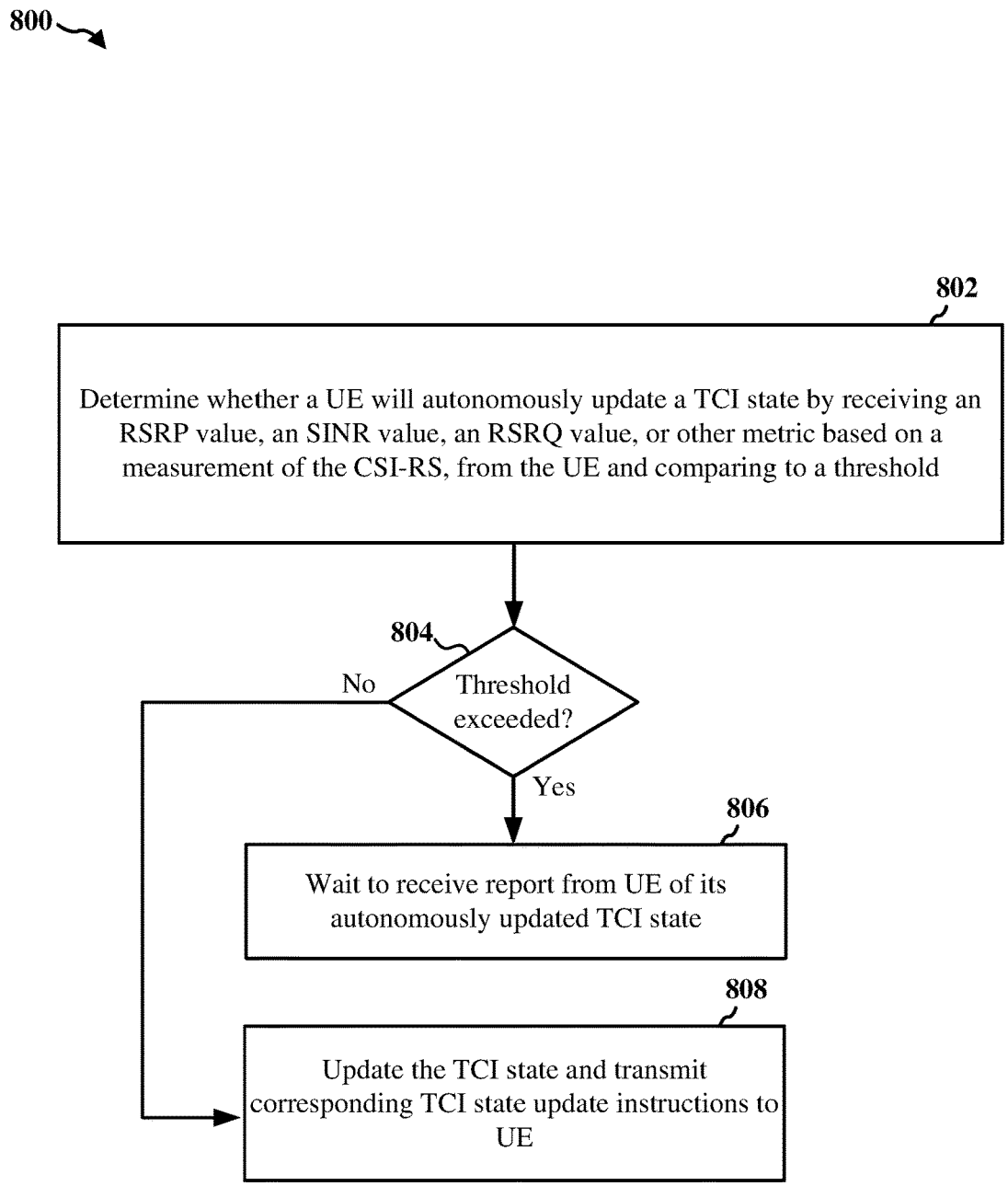
FIG. 8 illustrates a complementary procedure that may be performed by a base station to determine whether the UE will perform an autonomous TCI state update based on power metrics.

FIG. 8 illustrates a complementary procedure 800 that may be performed by a base station (e.g., base station 404) to determine whether the UE (e.g., UE 402) will perform an autonomous TCI state update based on, for example, power metrics. As noted above, it is useful for the base station and UE to perform consistent and coordinated TCI state update operations so the base station can know whether the UE will perform an autonomous TCI state update. In some examples, the procedure of FIG. 8 is performed only if the UE is permitted to perform autonomous TCI state updates, as previously described.

At 802, the base station determines whether the UE will autonomously update its TCI state by receiving an RSRP value, an SINR value, an RSRQ value, or other metric based on a measurement of the CSI-RS, from the UE and comparing to a threshold. For example, the base station may compare the measured metric (e.g., the RSRP value, SINR value, RSRQ value) to a configurable first power threshold, or may compare a difference between the measured metric and a current PDSCH power level to a configurable second power threshold (e.g., a threshold set to X db above the current PDSCH power level). The second power threshold may be referred to as a power difference threshold. In some examples, both the UE and the base station are programmed with or configured with the same threshold values so that the two devices reach the same determination based on the measured metric.

If the base station determines (e.g., at 804) that the applicable threshold is exceeded (e.g. the measured metric exceeds the first power threshold or the power difference value exceed the second power threshold), then at 806, the base station waits to receive a report (e.g., a CSI report) from the UE of its autonomously updated TCI state. The base station may perform other functions while waiting for the report. Otherwise, at 808, the base station updates the TCI state and transmits corresponding TCI state update instructions to the UE, so that the UE may update its TCI states accordingly.

FIG. 9 illustrates a procedure 900 that may be performed by a UE (e.g., the UE 402) to determine whether to perform an autonomous TCI state update based on, for example, a CSI report payload size. In some examples, the procedure is performed only if the UE is permitted to perform autonomous TCI state updates, as previously described.

At 902, the UE determines whether to autonomously update a TCI state by comparing a size of a payload of a CSI report generated by the UE to a size threshold. In some examples, the size threshold may be configurable or programmable. If the UE determines (e.g., at 904) that the applicable threshold is exceeded (e.g., the payload size of a CSI report exceeds a payload size threshold), then at 906, the UE updates the TCI state autonomously and transmits a report (e.g., a CSI report) to the base station. Otherwise, at 908, the UE updates the TCI state only in response to TCI state update instructions received from the base station, as previously described. As explained above, if the payload is sufficiently small, it is very likely the CSI report will be properly received at the base station and hence the base station will be informed of the autonomous TCI state update. If the payload is large, the CSI report may not be properly received at the base station and hence the base station will not be informed of the autonomous TCI state update. In such case, it may be better that the UE does not perform an autonomous TCI state update.

Figure 10:
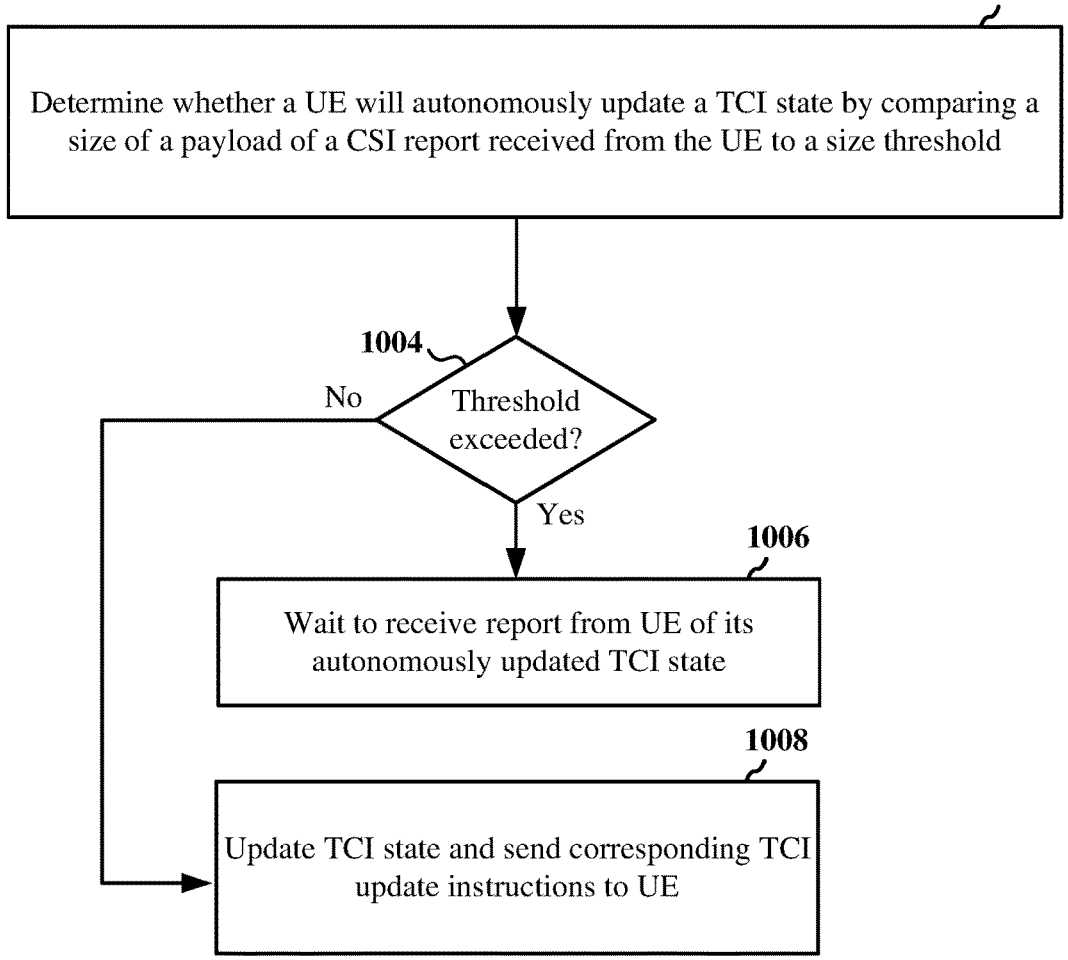
FIG. 10 illustrates a complementary procedure that may be performed by a base station to determine whether the UE will perform an autonomous TCI state update based on CSI report payload size.

FIG. 10 illustrates a complementary procedure 1000 that may be performed by a base station (e.g., base station 404) to determine whether the UE (e.g., UE 402) will perform an autonomous TCI state update based, for example, on CSI report payload size. As already explained, it is useful for the base station and UE to perform consistent and coordinated TCI state update operations so the base station can know whether the UE will perform an autonomous TCI state update. In some examples, the procedure of FIG. 10 is performed only if the UE is permitted to perform autonomous TCI state updates, as already discussed.

At 1002, the base station determines whether the UE will autonomously update its TCI state by comparing a size of a payload of a CSI report received from the UE to a size threshold. In some examples, the size threshold may be configurable or programmable Both the UE and the base station are programmed with or configured with the same threshold values (e.g., size threshold values) so that the base station and the UE reach the same determination based on the payload size of the CSI report.

At 1004, if the base station determines that the applicable threshold is exceeded (e.g. the size of the payload of the CSI report exceeds the size threshold), then at 1006, the base station waits to receive a report (e.g., the CSI report) from UE of its autonomously updated TCI state. In some examples, the base station can perform other functions while waiting for the report. Otherwise, at 1008, the base station updates the TCI state and transmits corresponding TCI state update instructions to the UE, so that the UE may update its TCI states accordingly.

Figure 11:
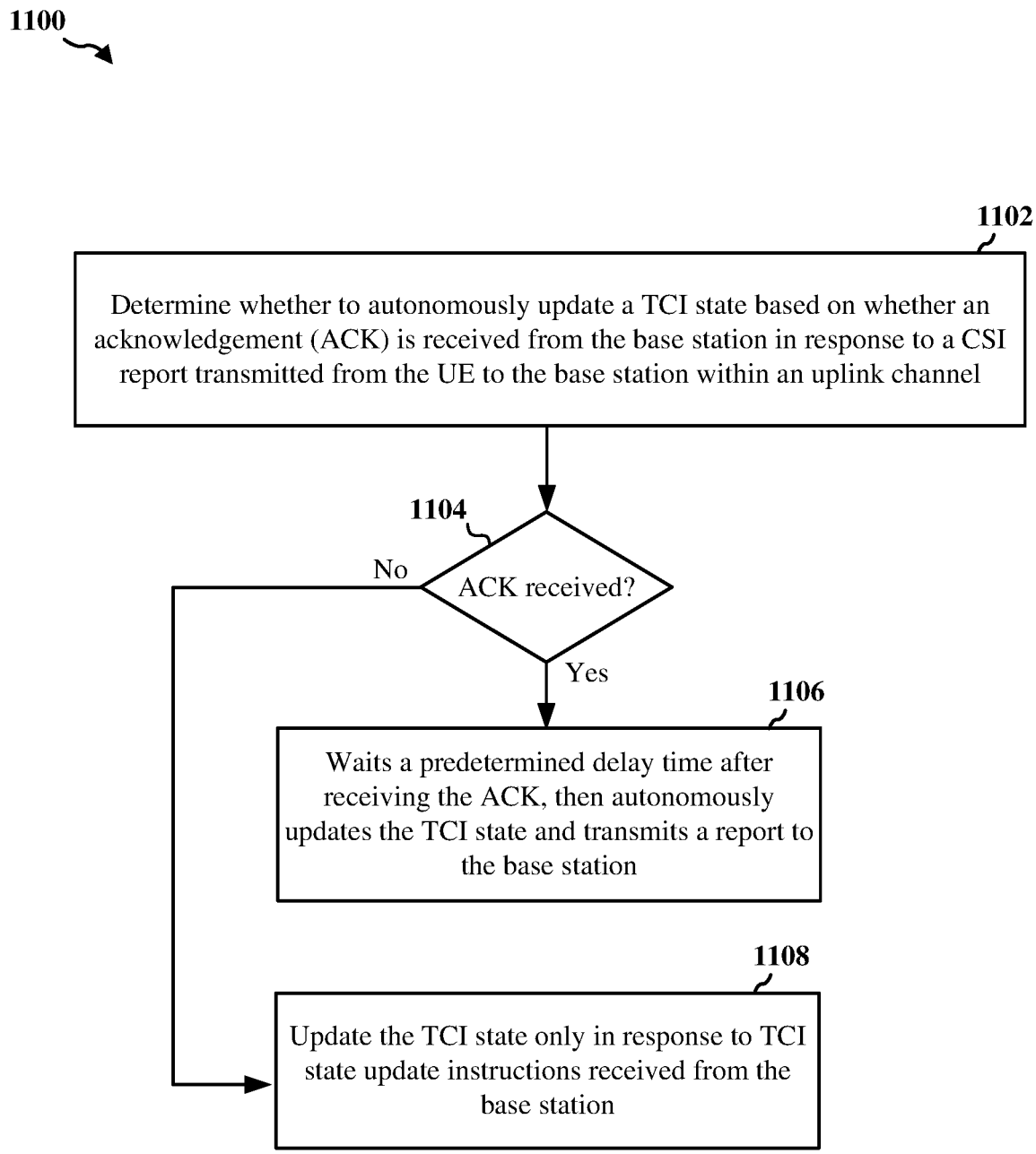
FIG. 11 illustrates a procedure 1100 that may be performed by a UE to determine whether to autonomously update a TCI state based on reception of an acknowledgement (ACK) in response to a CSI report.

FIG. 11 illustrates a procedure 1100 that may be performed by a UE (e.g., the UE 402) to determine whether to autonomously update a TCI state based on reception of an acknowledgement (ACK) in response to a CSI report. In some examples, the procedure 1100 is performed only if the UE is permitted to perform autonomous TCI state updates, as already discussed.

At 1102, the UE determines whether to autonomously update a TCI state based on whether an ACK is received from the base station in response to a CSI report transmitted from the UE to the base station within an uplink channel (e.g., PUSCH and/or PUCCH). For example, if the UE transmits the CSI report within a PUSCH, the ACK schedules a new transmission using a same hybrid automatic repeat request (HARQ) identifier (ID) as the PUSCH carrying the CSI report.

At 1104, if the UE determines that the applicable ACK has been received, then at 1106, the UE waits a predetermined delay time after receiving the ACK, then autonomously updates the TCI state and transmits a report (e.g., a CSI report) to the base station. Otherwise, at 1108, the UE updates the TCI state only in response to TCI state update instructions received from the base station, as already discussed. As described herein, it may be better that the UE does not perform an autonomous TCI state update in this scenario since, if no ACK is received, there may be issues preventing proper communication between the base station and the UE. If an ACK is received, it may be useful for the UE to delay the autonomous TCI state update to allow time for receipt of TCI state update instructions from the base station.

Figure 12:
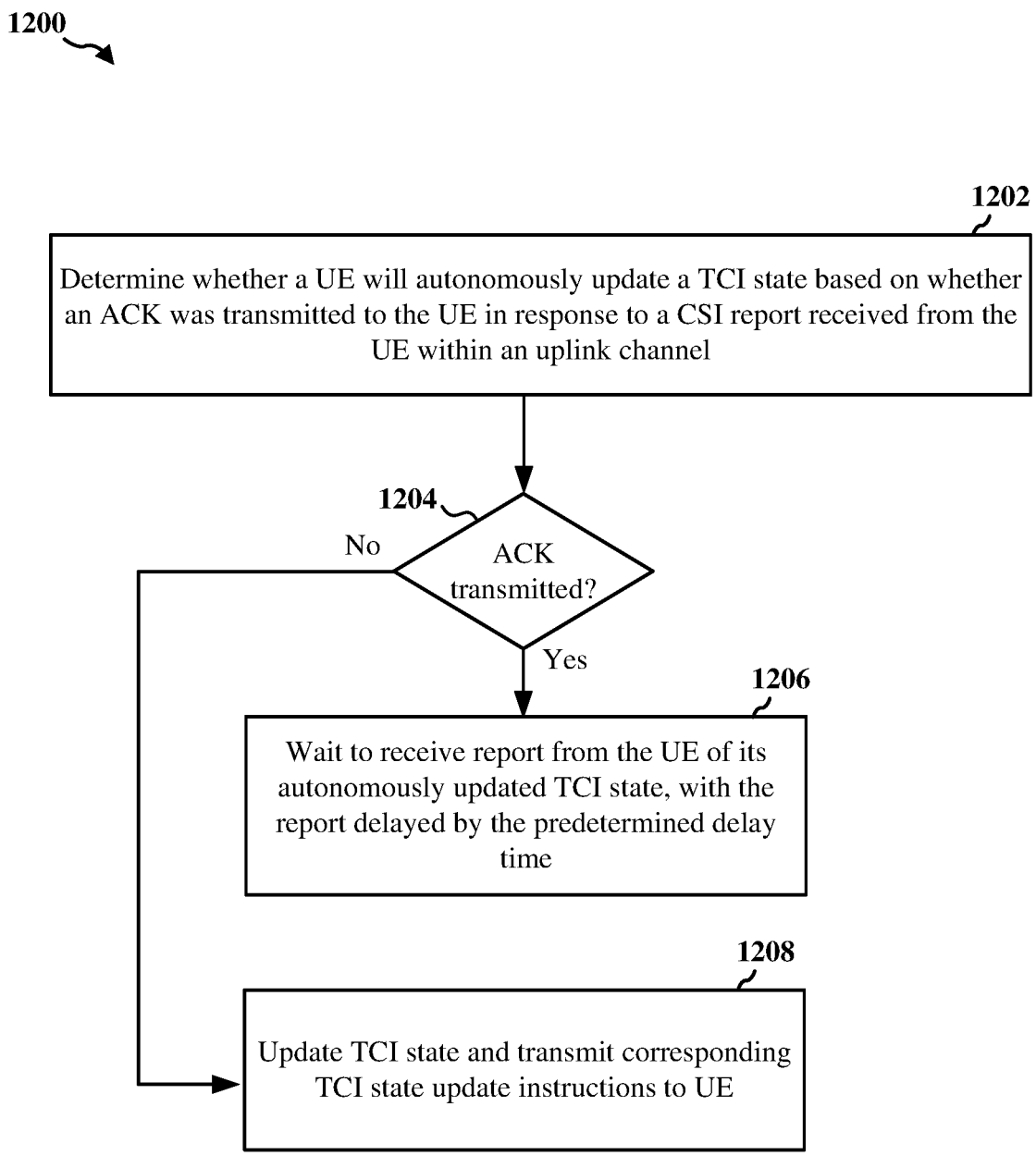
FIG. 12 illustrates a complementary procedure that may be performed by a base station to determine whether the UE will autonomously update a TCI state based on an acknowledgement (ACK) from the base station for a report (e.g., a CSI report) received from the UE.

FIG. 12 illustrates a complementary procedure 1200 that may be performed by a base station (e.g., base station 404) to determine whether the UE (e.g., UE 402) will autonomously update a TCI state based on an acknowledgement (ACK) from the base station for a report (e.g., a CSI report) received from the UE. As already explained, it is useful for the base station and UE to perform consistent and coordinated TCI state update operations so the base station can know whether the UE will perform an autonomous update. In some examples, the procedure 1200 of FIG. 12 is performed only if the UE is permitted to autonomously update a TCI state, as already discussed.

At 1202, the base station determines whether a UE will autonomously update a TCI state based on whether an ACK was transmitted to the UE in response to a CSI report received from the UE within an uplink channel (e.g., PUSCH and/or PUCCH). For example, if the CSI report is received within a PUSCH, the ACK schedules a new transmission using a same HARQ ID as the PUSCH carrying the CSI report At 1204, if the base station determines that the applicable ACK has been transmitted to the UE, then at 1206, the base station waits a predetermined delay time after transmitting the ACK to receive a report (e.g., a CSI report) from the UE of its autonomously updated TCI state. In some examples, the base station can perform other functions while waiting for the autonomous update report. Otherwise, at 1208, the base station updates a TCI state and transmits corresponding TCI state update instructions to UE.

FIG. 13 illustrates a procedure 1300 that may be performed by a UE (e.g., UE 402) to report an autonomously updated TCI state. The procedure is performed only if the UE is permitted to perform autonomous TCI state updates, as previously described.

At 1302, the UE generates a CSI report to report the TCI that includes an indication of the TCI state and an associated measured metric, where (1) the CSI report further includes an indication for each TCI state in the report indicating whether the TCI state is updated by the UE, (2) the autonomous TCI state update is reported by replacing a top K number of TCI states in a CSI report that is not currently configured with corresponding updated TCI states, and/or (3) the autonomous update is reported by replacing TCI states that are not currently configured and are among a top K number of TCI states in the CSI report with corresponding updated TCI states. At 1304, the UE transmits the CSI report.

Although not shown in FIG. 13, in other examples, one or more of the following features may be implemented: (1) if the UE is configured with fewer than a maximum number (N) of configurable TCI states, the UE reports the autonomous TCI state update by appending a qualified updated TCI state in a TCI state list, (2) if the UE is configured with a maximum number (N) of configurable TCI states, the UE reports the autonomous update by replacing an entry in a TCI state list with a qualified updated TCI state, (3) the UE selects the entry in the TCI state list to replace based on an ID, (4) the UE reports the autonomous update to the base station and replaces a TCI state ID in a PDSCH TCI state list with a TCI state ID associated with a reported CSI-RS resource, (5) the UE reports the autonomous update to the base station by revising content of a TCI state configuration ID in a PDSCH TCI state list to reflect a TCI state ID associated with a reported CSI-RS resource, and/or (6) the UE revises the content by revising a reference signal in a QCL information field of the corresponding TCI state configuration to reflect a TCI state ID associated the reported CSI-RS resource ID.

Figure 14:
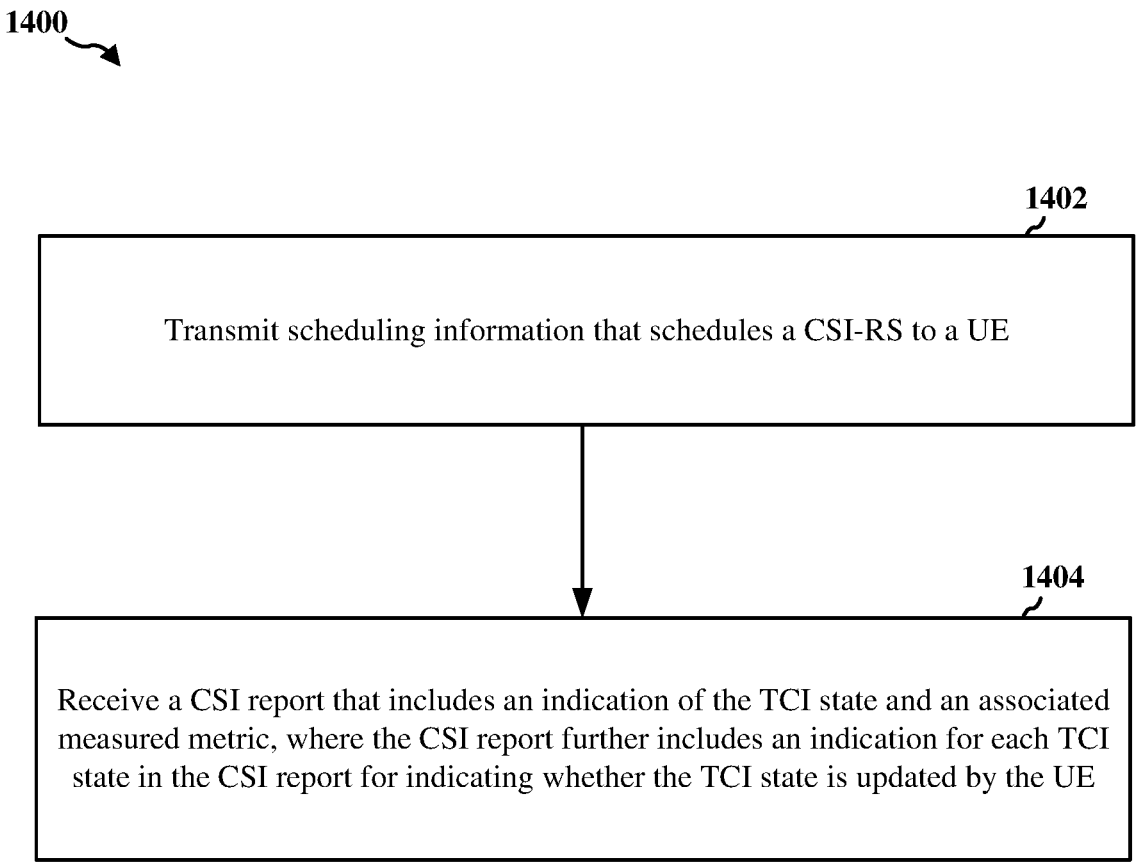
FIG. 14 illustrates a complementary procedure that may be performed by a base station to receive a report of an autonomously updated TCI state.

FIG. 14 illustrates a complementary procedure 1400 that may be performed by a base station (e.g., base station 404) to receive a report of an autonomously updated TCI state. At 1402, the base station transmits scheduling information that schedules a CSI-RS to a UE. At 1404, the base station receives a CSI report (e.g., for reporting the TCI) that includes an indication of the TCI state and an associated measured metric, where the CSI report further includes an indication for each TCI state in the CSI report for indicating whether the TCI state is updated by the UE.

Figure 15:
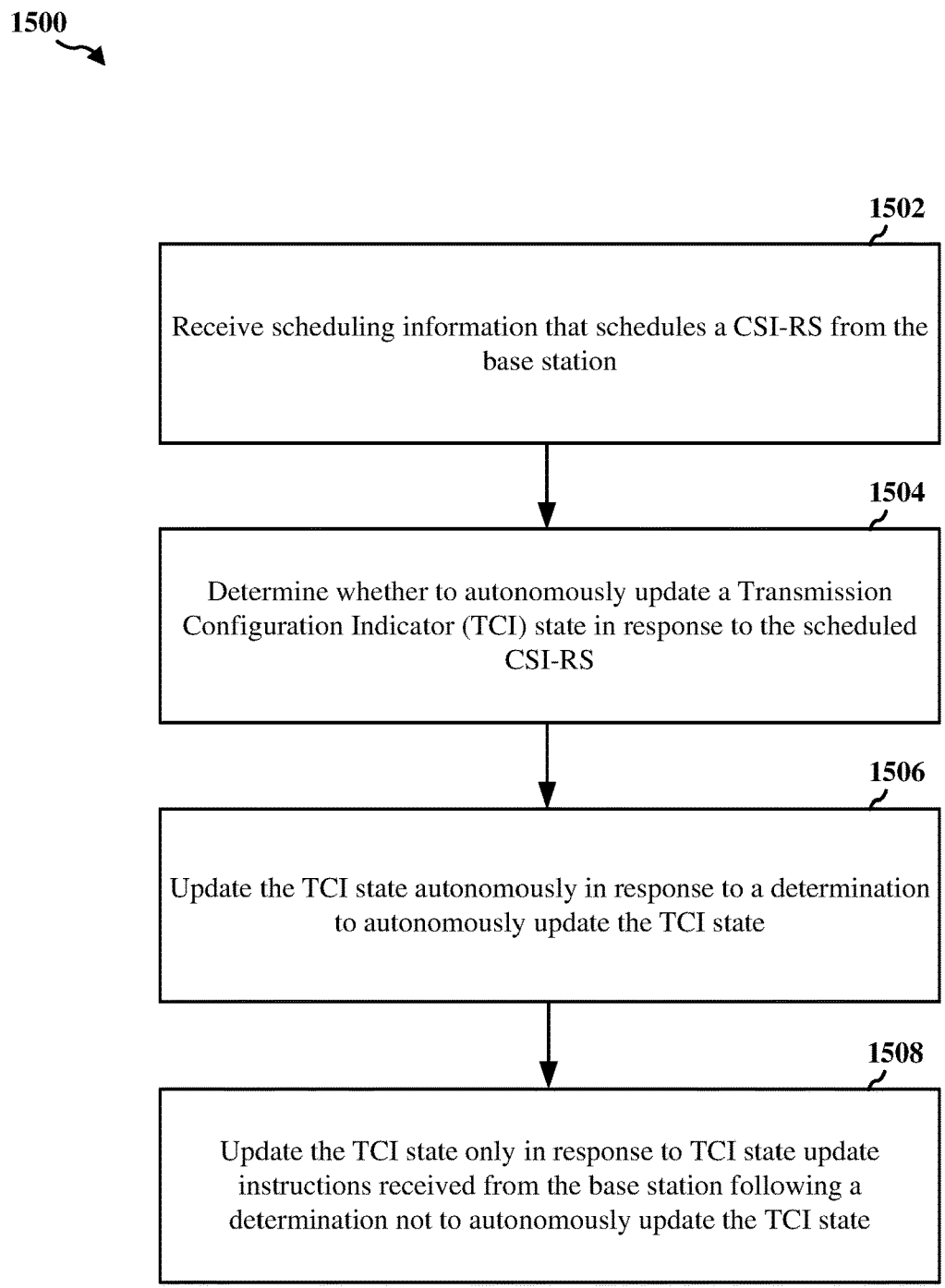
FIG. 15 is a flowchart of a method of wireless communication for a UE.

FIG. 15 is a flowchart 1500 of a method of wireless communication. The method may be performed by a UE (e.g., the UE 104, 402; the apparatus 1702/1702'; the processing system 1814, which may include the memory 360 and which may be the entire UE 104 or a component of the UE 104, such as the TX processor 368, the RX processor 356, and/or the controller/processor 359).

At 1502, the UE receives scheduling information that schedules a CSI-RS from the base station. For example, with reference to FIG. 4, the UE 402 may receive the scheduling information 405 that schedules a reference signal, such as a CSI-RS, for the UE 402.

At 1504, the UE determines whether to autonomously update a TCI state in response to the scheduled CSI-RS. In some examples, the determination may include determining whether the UE is permitted to perform an autonomous TCI state update based on the scheduling information. For example, at 410 and 412 in FIG. 4, the UE 402 determines whether to autonomously update a TCI state.

At 1506, the UE updates the TCI state autonomously in response to a determination to autonomously update the TCI state. In some examples, the UE may transmit the updated TCI state to the base station. For example, at block 414 in FIG. 4, the UE 402 autonomously updates a TCI state and transmits a report or other indication 416 to the base station 404.

At 1508, the UE updates the TCI state only in response to TCI state update instructions received from the base station following a determination not to autonomously update the TCI state. For example, with reference to FIG. 4, the UE 402 at 426 receives and the TCI state update instructions 424 from the base station 404 and updates a TCI state based on the TCI state update instructions 424.

Figure 16:
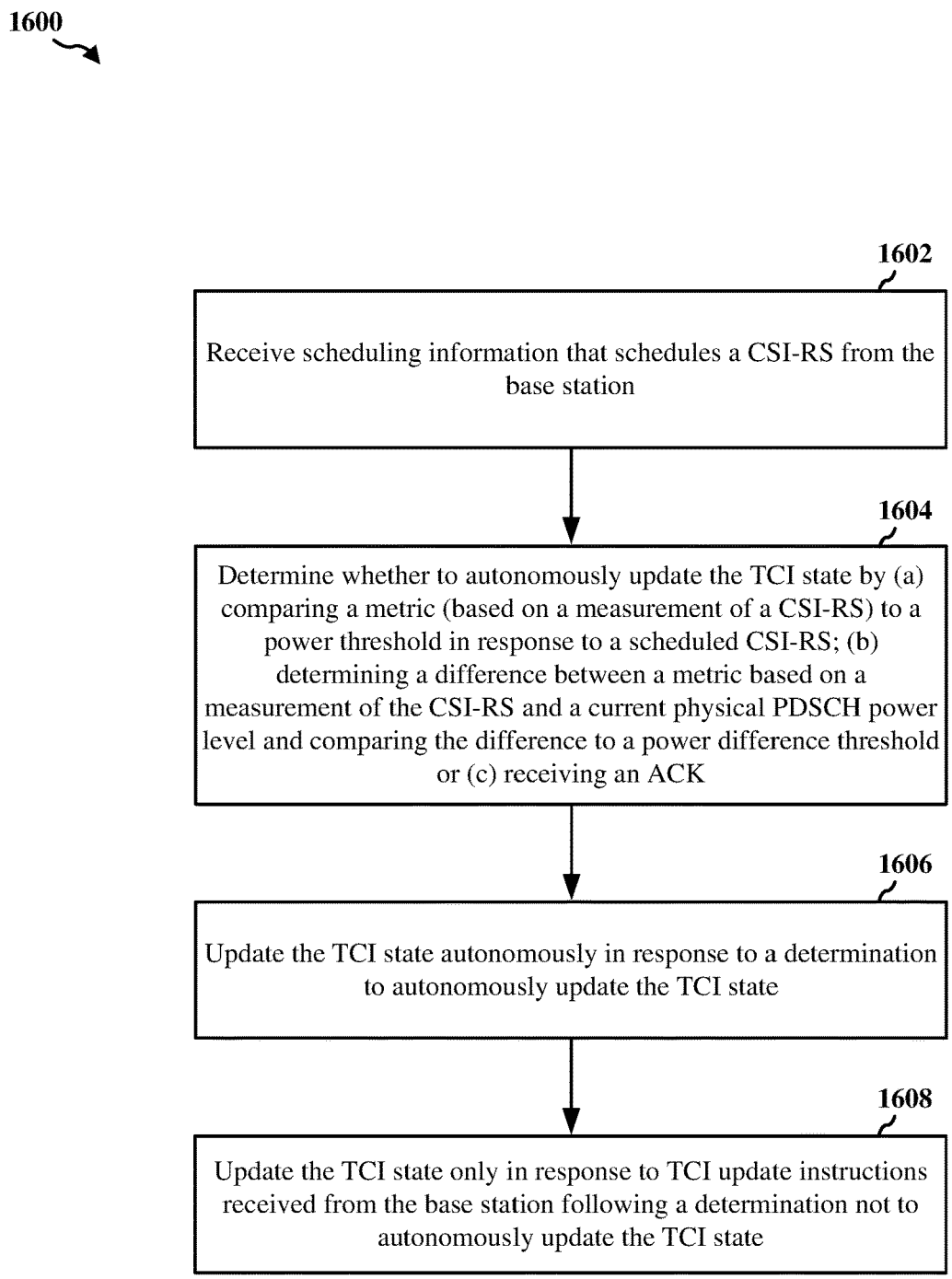
FIG. 16 is a flowchart of another method of wireless communication for a UE.

FIG. 16 is a flowchart 1600 of a method of wireless communication. The method may be performed by a UE (e.g., the UE 104, 402; the apparatus 1702/1702'; the processing system 1814, which may include the memory 360 and which may be the entire UE 104 or a component of the UE 104, such as the TX processor 368, the RX processor 356, and/or the controller/processor 359).

At 1602, the UE receives the scheduling information that schedules a CSI-RS from the base station. For example, at 405 in FIG. 4, the UE 402 receives scheduling information that schedules a CSI-RS from the base station 404. The scheduling information 405 may further schedule or configure a responsive CSI-RS report.

At 1604, the UE determines whether to autonomously update the TCI state by (a) comparing a metric (based on a measurement of a CSI-RS) to a power threshold in response to a scheduled CSI-RS; (b) determining a difference between a metric based on a measurement of the CSI-RS and a current physical PDSCH power level and comparing the difference to a power difference threshold or (c) receiving an ACK. For example, at 410 in FIG. 4, the UE 402 determines whether to autonomously update the TCI state. As described herein in connection with FIG. 11, in some examples, the determination is based on whether an ACK is received from the base station in response to a CSI report transmitted from the UE to the base station. In some particular examples, if the CSI report is transmitted within a PUSCH, the ACK schedules a new transmission using a same HARQ ID as the PUSCH carrying the CSI report.

For example, at 409 of FIG. 4, the UE 402 may receive an ACK from the base station 404 in response to a CSI report sent by the UE 402 at 408. Then, at 410 in FIG. 4, the UE 402 determines whether to autonomously update the TCI state based on the receipt of the ACK. In other examples, the UE 402 of FIG. 4 determines whether to autonomously update the TCI state by (a) comparing a metric (based on a measurement of a CSI-RS) to a power threshold in response to a scheduled CSI-RS; (b) determining a difference between a metric based on a measurement of the CSI-RS and a current physical PDSCH power level and comparing the difference to a power difference threshold.

At 1606, the UE updates the TCI state autonomously in response to a determination to autonomously update the TCI state. In some examples, the UE transmits TCI state information to the base station. For example, in FIG. 4, the UE 402 updates the TCI state autonomously at 414 in response to a determination made at 412 to autonomously update the TCI state, and the UE 402 transmits TCI state information to the base station 404 at 416.

At 1608, the UE updates the TCI state only in response to TCI state update instructions received from the base station following a determination not to autonomously update the TCI state. For example, the UE may determine not to autonomously update the TCI state if the UE lacks permission to autonomously update the TCI state. For example, at 426 in FIG. 4, the UE 402 updates the TCI state autonomously only in response to TCI state update instructions 424 received from the base station 404 following a determination (made at 412 by the UE 402) not to autonomously update the TCI state.

Figure 17:
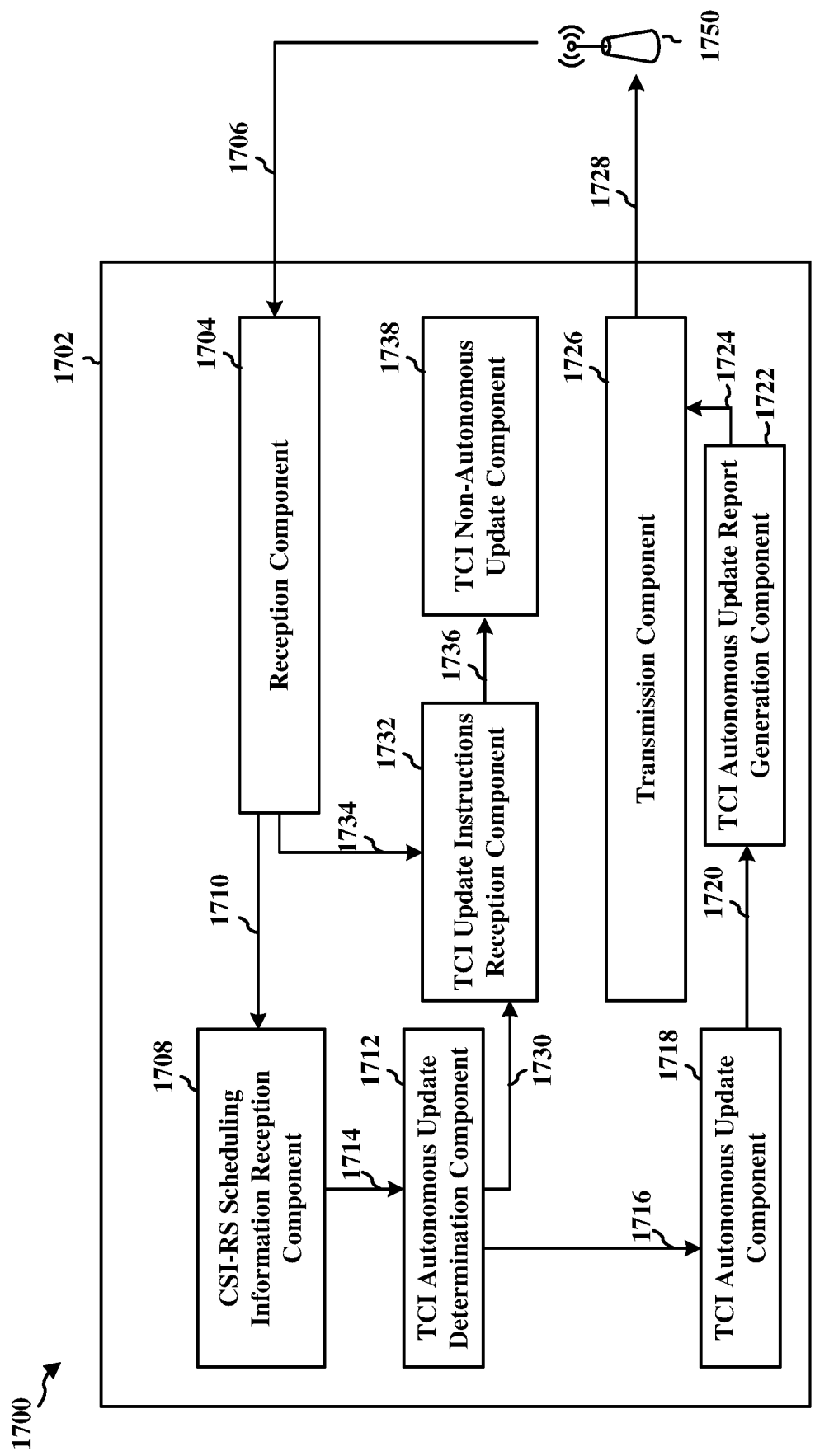
FIG. 17 is a conceptual data flow diagram illustrating the data flow between different means/components in an example apparatus, such as a UE.

FIG. 17 is a conceptual data flow diagram 1700 illustrating the data flow between different means/components in an example apparatus 1702. The apparatus may be a UE. The apparatus includes a reception component 1704 that receives downlink signals 1706 from a base station 1750, which may include CSI-RS scheduling signals and information pertaining to current TCI states. The apparatus further includes a CSI-RS scheduling information reception component 1708 that receives CSI-RS scheduling signals and TCI state information 1710 from the reception component 1704 and decodes the signals or parses the data, if needed. The apparatus further includes a TCI autonomous update determination component 1712 that receives the signals/data 1714 and determines whether to autonomously update a TCI state. The determination whether to autonomously update a TCI state may be based on various conditions, rules, and measured parameters, as described herein.

If the TCI autonomous update determination component 1712 determines to autonomously update a TCI state of the apparatus 1702, the TCI autonomous update determination component 1712 transmits a suitable control signal 1716 to a TCI autonomous update component 1718, along with current TCI state information. The TCI autonomous update component 1718 updates the TCI state using one or more of the procedures described herein. The TCI autonomous update component 1718 forwards updated TCI state information 1720 to a TCI autonomous update report generation component 1722. The TCI autonomous update report generation component 1722 generates a report 1724 for transmission to the base station 1750. The report 1724 may include a CSI report configured to report the updated TCI state. The TCI autonomous update report generation component 1722 forwards the report 1724 to a transmission component 1726, which transmits the report 1724 to the base station 1750.

If the TCI autonomous update determination component 1712 determines not to autonomously update a TCI state, a suitable control signal 1730 is transmitted to a TCI update instructions reception component 1732, which awaits receipt of instructions 1734 from the base station 1750 via the reception component 1704 to (non-autonomously) update the TCI states maintained within the apparatus 1702. The TCI update instructions reception component 1732 relays the instructions 1736 to a TCI non-autonomous update component 1738. The TCI non-autonomous update component 1738 updates the TCI states within the apparatus 1702 based on the instructions 1736.

The apparatus may include additional components that perform each of the blocks of the UE-side algorithm in the aforementioned flowcharts of FIGS. 4, 5, 7, 9, 11, 13, 15, 16. As such, each UE-side block in the aforementioned flowcharts of FIGS. 4, 5, 7, 9, 11, 13, 15, 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
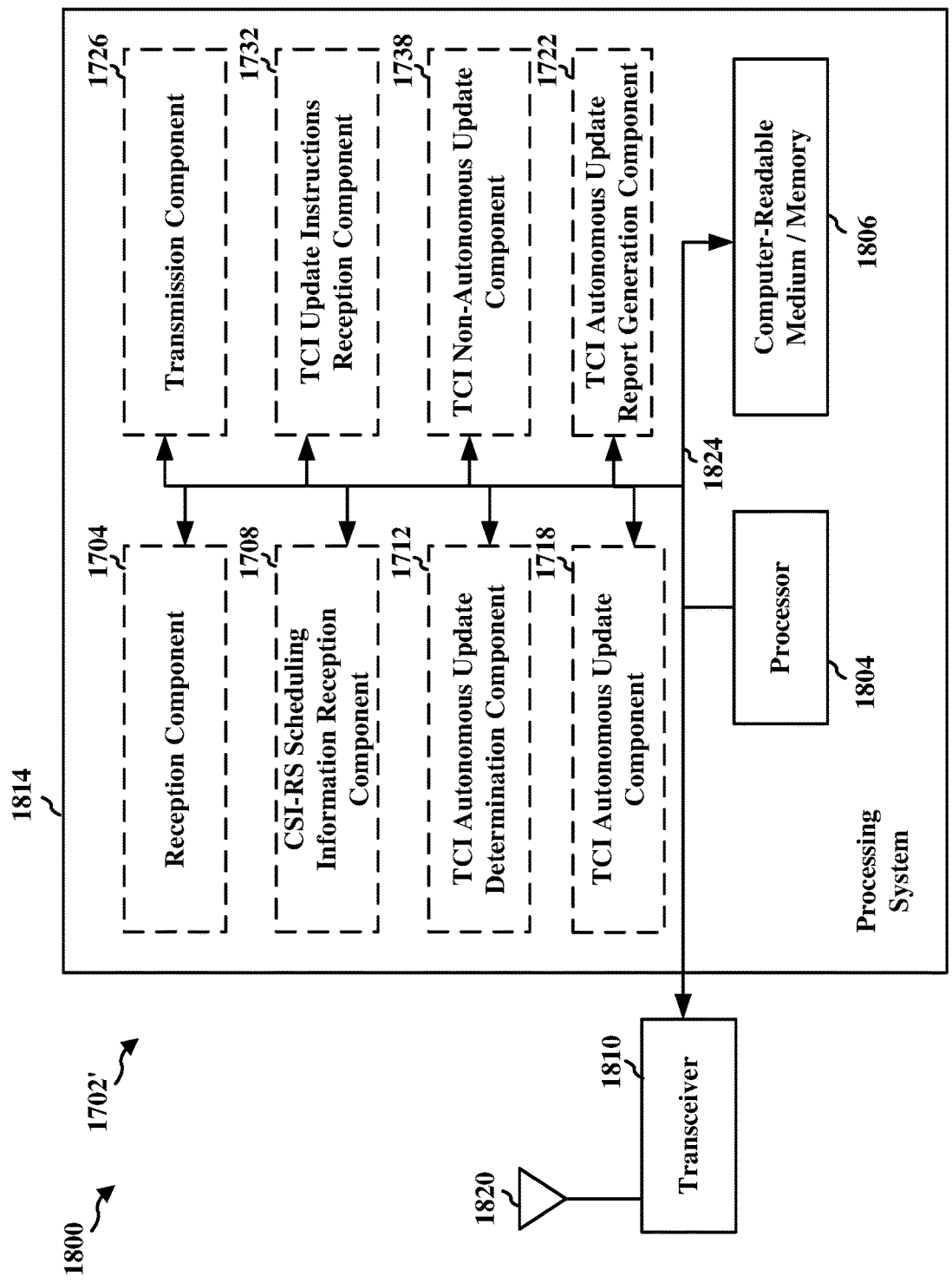
FIG. 18 is a diagram illustrating an example of a hardware implementation for an apparatus, such as a UE, employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1708, 1712, 1718, 1722, 1726, 1732, 1738 and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1726, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1708, 1712, 1718, 1722, 1726, 1732, 1738. The components may be software components running in the processor 1804, resident/stored in the computer readable medium/memory 1806, one or more hardware components coupled to the processor 1804, or some combination thereof.

In one configuration, the apparatus 1702/1702' for wireless communication includes: means for receiving scheduling information that schedules a CSI-RS from a base station; means for determining whether to autonomously update a TCI state in response to the scheduled CSI-RS; means for updating the TCI state autonomously in response to a determination to autonomously update the TCI state, means for updating the TCI state only in response to TCI state update instructions received from the base station following a determination not to autonomously update the TCI state, means for transmitting a CSI report within one of a physical uplink shared channel (PUSCH) or a physical uplink control channel (PUCCH).

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 19:
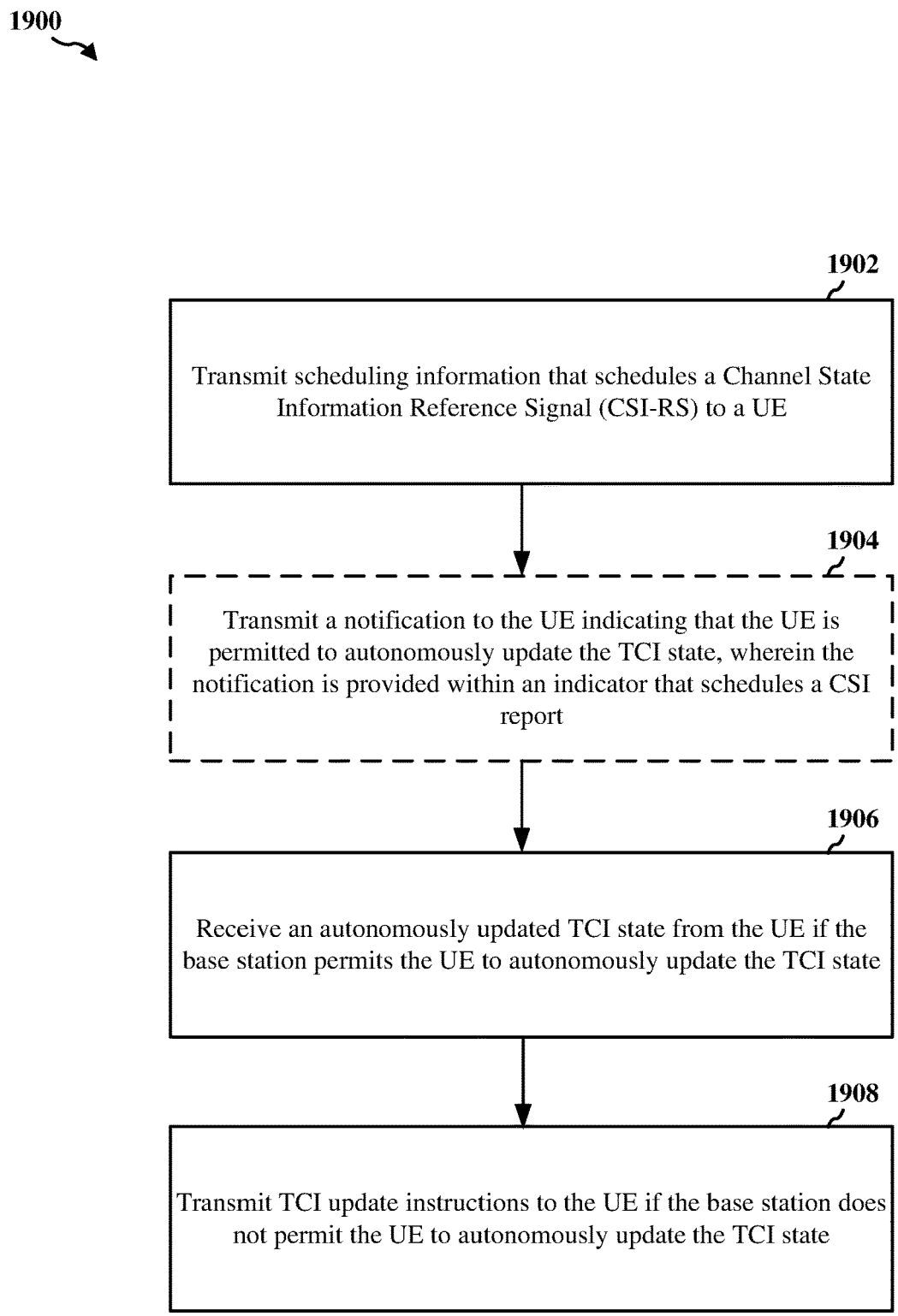
FIG. 19 is a flowchart of a method of wireless communication for a base station.

FIG. 19 is a flowchart 1900 of a method of wireless communication. The method may be performed by a base station (e.g., the base station 102, 404; the apparatus 2002/2002'; the processing system 2114, which may include the memory 376 and which may be the entire base station 102, 404 or a component of the base station 102, 404, such as the TX processor 316, the RX processor 370, and/or the controller/processor 375).

At 1902, the base station, transmits scheduling information that schedules a Channel State Information Reference Signal (CSI-RS) to a UE. For example, in FIG. 4, the base station 404 transmits scheduling information 405 that schedules a CSI-RS to the UE 402. The scheduling information 405 may further schedule or configure a responsive CSI-RS report.

At 1904, the base station transmits a notification to the UE indicating that the UE is permitted to autonomously update the TCI state, wherein the notification is provided within an indicator that schedules a CSI report. For example, in FIG. 4, the base station 404 transmits an indication 407 to the UE 402. The indication 407 may indicate that the UE 402 is permitted to autonomously update a TCI state.

At 1906, the base station receives an autonomously updated TCI state from the UE if the base station permits the UE to autonomously update the TCI state. For example, in FIG. 4, the base station 404 receives an autonomously updated TCI state at 416 from the UE 404 if the base station permits the UE 402 to autonomously update the TCI state.

At 1908, the base station transmits TCI state update instructions to the UE if the base station does not permit the UE to autonomously update the TCI state. For example, in FIG. 4, the base station 404 transmits TCI state update instructions at 424 to the UE 402 if the base station 404 does not permit the UE 402 to autonomously update the TCI state. The TCI state update instructions transmitted at 424 from the base station 404 to the UE 402 may be in a MAC-CE.

Figure 20:
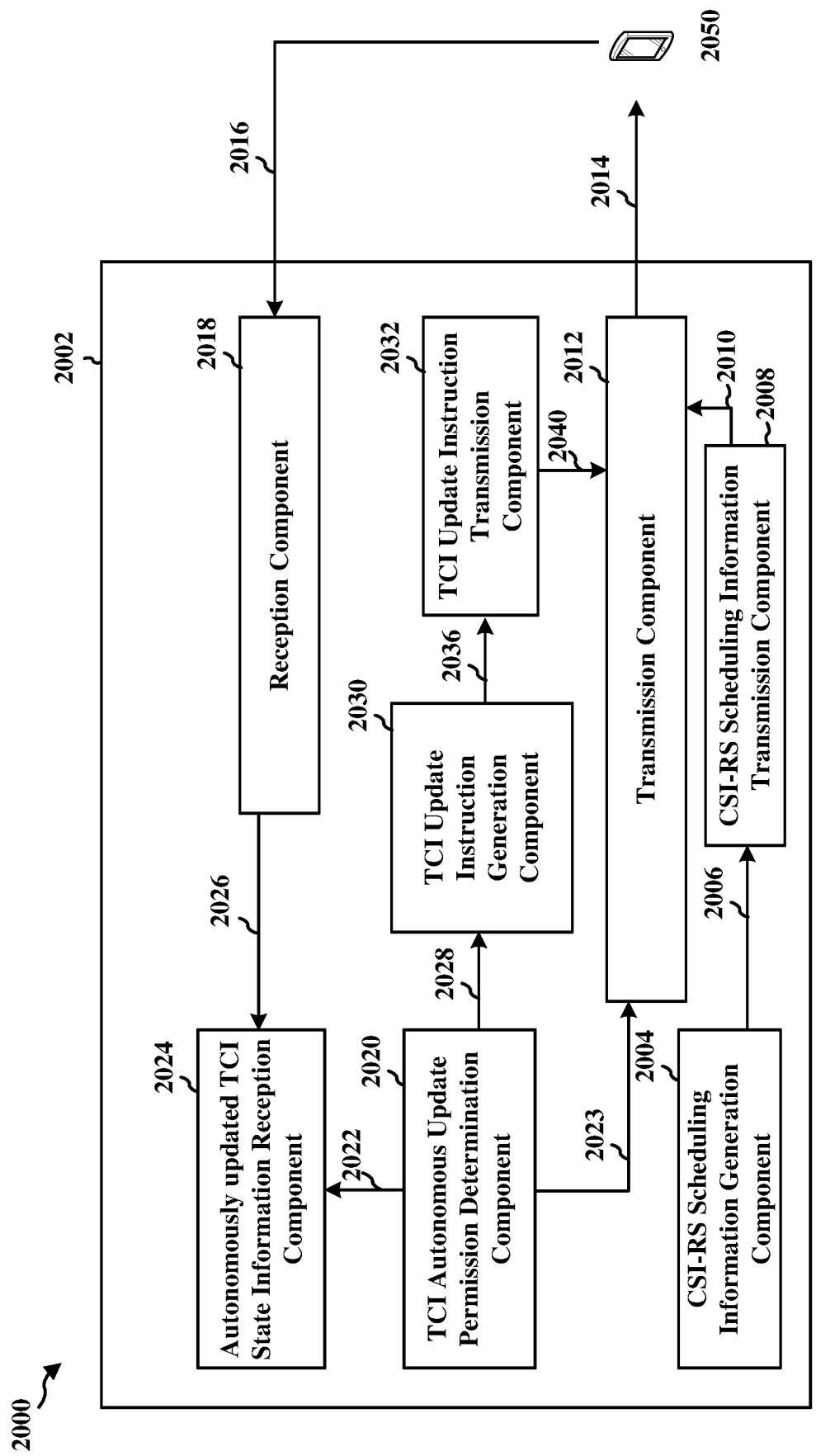
FIG. 20 is a conceptual data flow diagram illustrating the data flow between different means/components in an example apparatus, such as a base station.

FIG. 20 is a conceptual data flow diagram 2000 illustrating the data flow between different means/components in an example apparatus 2002. The apparatus may be a base station.

The apparatus includes a CSI-RS scheduling information generation component 2004 that generates scheduling information 2006 that schedules a CSI-RS for a UE (e.g., UE 2050). The CSI-RS scheduling information generation component 2004 provides the scheduling information 2006 to a CSI-RS scheduling information transmission component 2008 that transmits the scheduling information 2010 (properly formatted as a suitable downlink signal) to a transmission component 2012. The transmission component 2012 transmits the scheduling information as a downlink signal 2014 to the UE 2050. Uplink signals 2016 may be received from the UE 2050 at a reception component 2018.

The apparatus may additionally include a TCI autonomous update permission determination component 2020 that determines whether the UE 2050 is permitted to autonomously update a TCI state in response to the scheduled CSI-RS. If the UE 2050 is permitted to autonomously update a TCI state, then the TCI autonomous update permission determination component 2020 transmits a suitable control signal 2022 to an autonomously updated TCI state information reception component 2024. The autonomously updated TCI state information reception component 2024 awaits receipt of a report 2026 (e.g., a CSI report) received from the UE 2050 via the reception component 2018 of the autonomously updated TCI state. That is, the autonomously updated TCI state information reception component 2024 is a device configured to receive an autonomously updated TCI state from the UE 2050 if the base station permits the UE 2050 to autonomously update the TCI state.

If the UE 2050 is not permitted to perform an autonomous update of a TCI state, then the TCI autonomous update permission determination component 2020 transmits a suitable control signal 2028 to a TCI update instruction generation component 2030 that generates TCI state update instructions 2036. The TCI update instruction generation component 2030 transmits the TCI state update instructions 2036 to a TCI update instruction transmission component 2032. The TCI update instruction transmission component 2032 may provide the TCI state update instructions 2040 to the transmission component 2012 for transmission to the UE 2050 as downlink signals 2014. That is, the TCI update instruction transmission component 2032 is a device configured to transmit the TCI state update instructions 2040 to the UE 2050 if the apparatus 2002 does not permit the UE 2050 to autonomously update the TCI state.

The apparatus may include additional components that perform each of the blocks of the base station-side algorithm in the aforementioned flowcharts of FIGS. 4, 6, 8, 10, 12, 14. As such, each base station-side block in the aforementioned flowcharts of FIGS. 4, 6, 8, 10, 12, 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
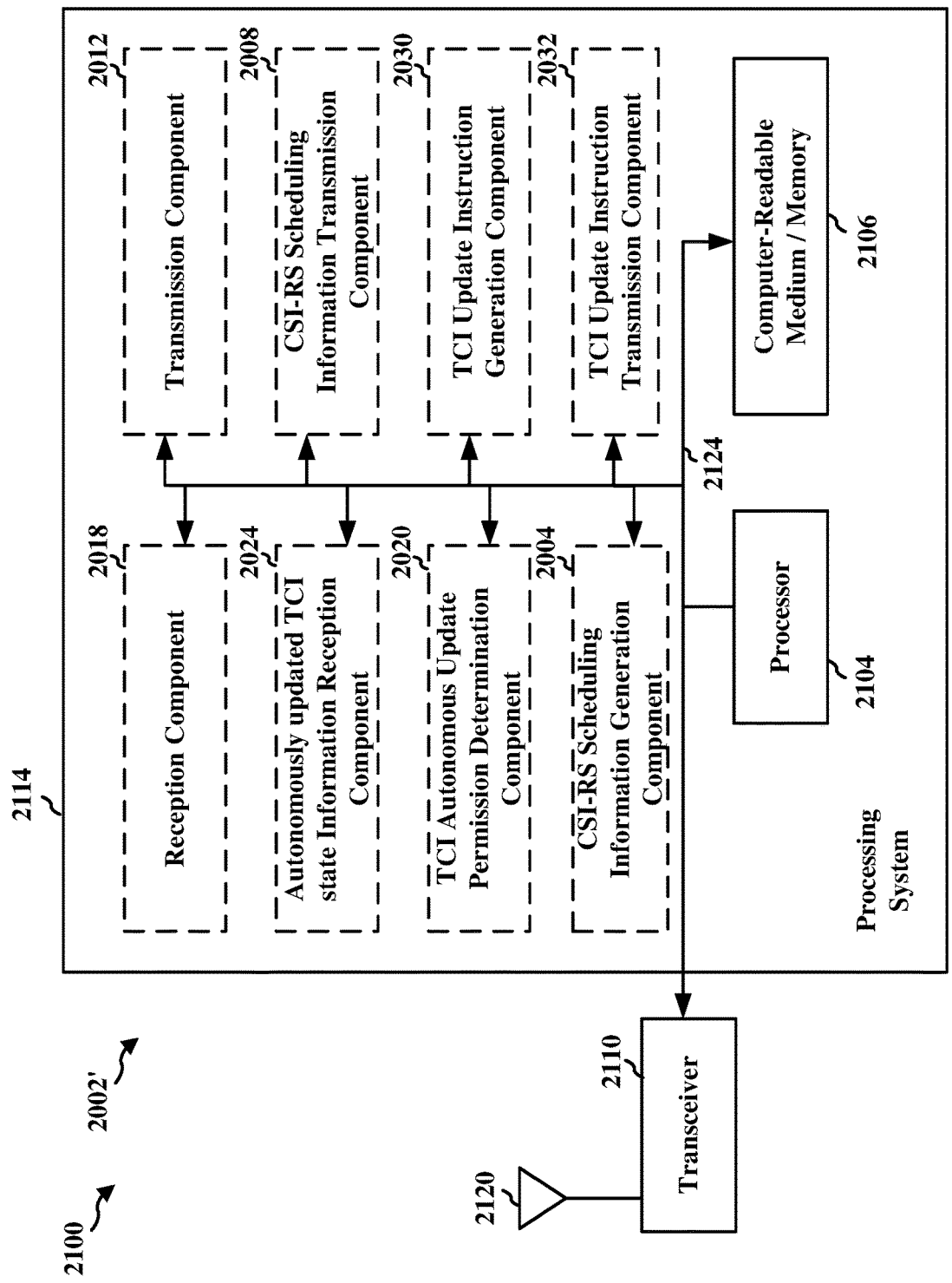
FIG. 21 is a diagram illustrating an example of a hardware implementation for an apparatus, such as a base station, employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 2004, 2008, 2012, 2018, 2020, 2024, 2030, 2032, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 1318. In addition, the transceiver 2110 receives information from the processing system 2114, specifically the transmission component 1312, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106.

The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 2004, 2008, 2012, 2018, 2020, 2024, 2030, 2032. The components may be software components running in the processor 2104, resident/stored in the computer readable medium/memory 2106, one or more hardware components coupled to the processor 2104, or some combination thereof.

The processing system 2114 may be a component of the base station 310 and may include the memory 376 and/or at least one of the TX processor 316, the RX processor 370, and the controller/processor 375. Alternatively, the processing system 2114 may be the entire base station (e.g., see, base station 310 of FIG. 3).

In one configuration, the apparatus 2002/2002' for wireless communication includes means for transmitting scheduling information that schedules a CSI-RS to a UE; means for receiving an autonomously updated TCI state from the UE if the base station permits the UE to autonomously update the TCI state; and means for transmitting TCI state update instructions to the UE if the base station does not permit the UE to autonomously update the TCI state.

The aforementioned means may be one or more of the aforementioned components of the apparatus 2002 and/or the processing system 2114 of the apparatus 2002' configured to perform the functions recited by the aforementioned means. As described supra, the processing system 2114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Thus systems, methods, apparatus, etc., are described herein that, among other features, set forth conditions and rules for controlling and coordinating autonomous TCI state updates by a UE. Among other advantages, latency may be reduced and system performance enhanced. The methods may be applied to a periodic CSI-RS, a semi-persistent CSI-RS, and/or an aperiodic CSI-RS.

Still further, in some aspects, the following features or consideration are provided that pertain to or relate to conditions for autonomously updating a TCI state at a UE.

Turning now to mTRP, it is advantageous to extend autonomous TCI state updating to mTRP. This may be achieved by configuring a UE and an mTRP base station to follow a common set of rules or procedures for coordinating autonomous TCI state updates for use with mTRP. In some examples, such common set of rules or procedures may be specified in wireless communication standards (e.g., 3GPP standards) implemented at the UE and the base station. In some aspects disclosed hereinbelow, the foregoing autonomous TCI state updates is extended to mTRP cases. Rules are defined and provided on how to map the reported beams to TCI states in a codepoint for mTRP, e.g., in single DCI (sDCI) and multiple DCIs (mDCI) cases.

In one aspect, the UE may receive from mTRPs or transmit to mTRPs beams in different locations. This helps to improve spatial diversity against blockages. In some aspects, up to two TRPs are considered. Transmissions from different TRPs can be scheduled by a single sDCI from one TRP or mDCI. PDSCH transmissions from different TRPs can be time division multiplexed (TDM), frequency division multiplexed (FDM), and space division multiplexed (SDM). A base station may indicate the multiplexing scheme (e.g., TDM, FDM, SDM) used for the PDSCH in DCI transmitted to the UE.

In sDCI scheduling, for example, a codepoint may consist of up to two TCI states, which may be indicated in the DCI. Each TCI state may be associated with a different TRP. Each TCI state for the PDSCH indicated in the PDSCH configuration can be also assigned with a CORESET pool ID.

In mDCI cases, for example, if the TCI state for PDSCH is configured with a CORESET pool ID, the TCI state for the PDSCH can be only scheduled in some examples by a DCI received in a CORESET using the same CORESET pool ID. The CORESET pool ID is an indication of TRP. In some examples, up to eight pairs of TCI states can be configured for the PDSCH. Each pair can be two TCI states or a single TCI state (with the second TCI field reserved).

Figure 22:
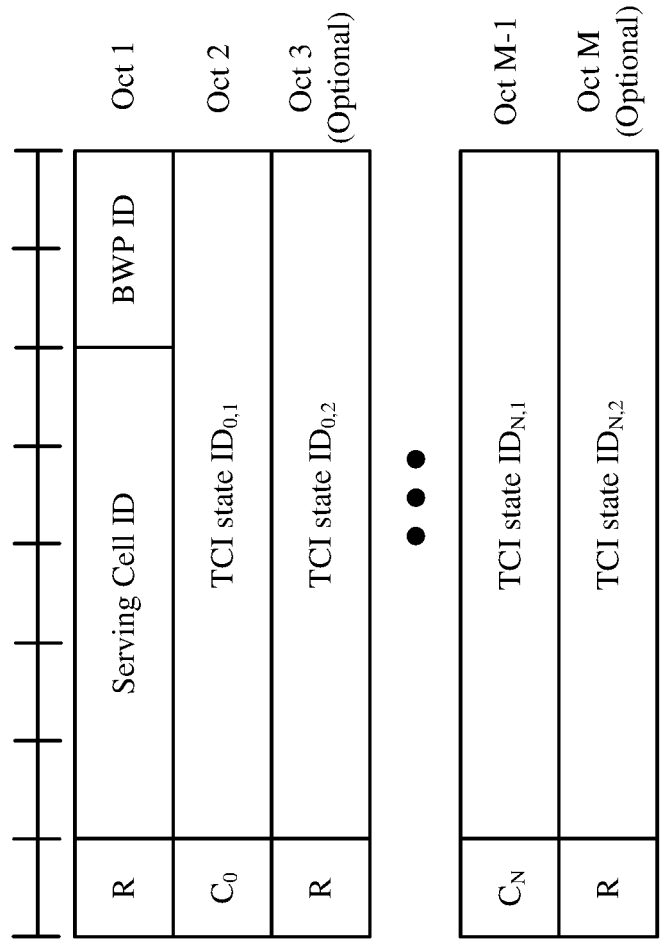
FIG. 22 illustrates exemplary Enhanced TCI States Activation/Deactivation parameters.

FIG. 22 illustrates portions of a MAC PDU 2200 for Enhanced TCI States Activation/Deactivation for UE-specific PDSCH MAC CE, which is a feature of some 5G NR specifications. See, for example, 3GPPP ETSI TS 138 321 specifications for Medium Access Control (MAC) Protocol Specification. The MAC PDU 2200 includes various fields, as shown, for listing TCI state IDs along with a serving cell ID and a bandwidth part (BWP) ID. As discussed in detail above, in some aspects, TCI states are updated, such as the TCI states of the MAC PDU 2200. In particular, as discussed above, in some examples, up to eight pairs of TCI states can be configured for PDSCH. Each pair can be two TCI states or a single TCI state (with the second TCI field reserved). The example MAC PDU 2200 in FIG. 22 may pertain to TCI codepoints for sDCI described herein.

Figure 23:
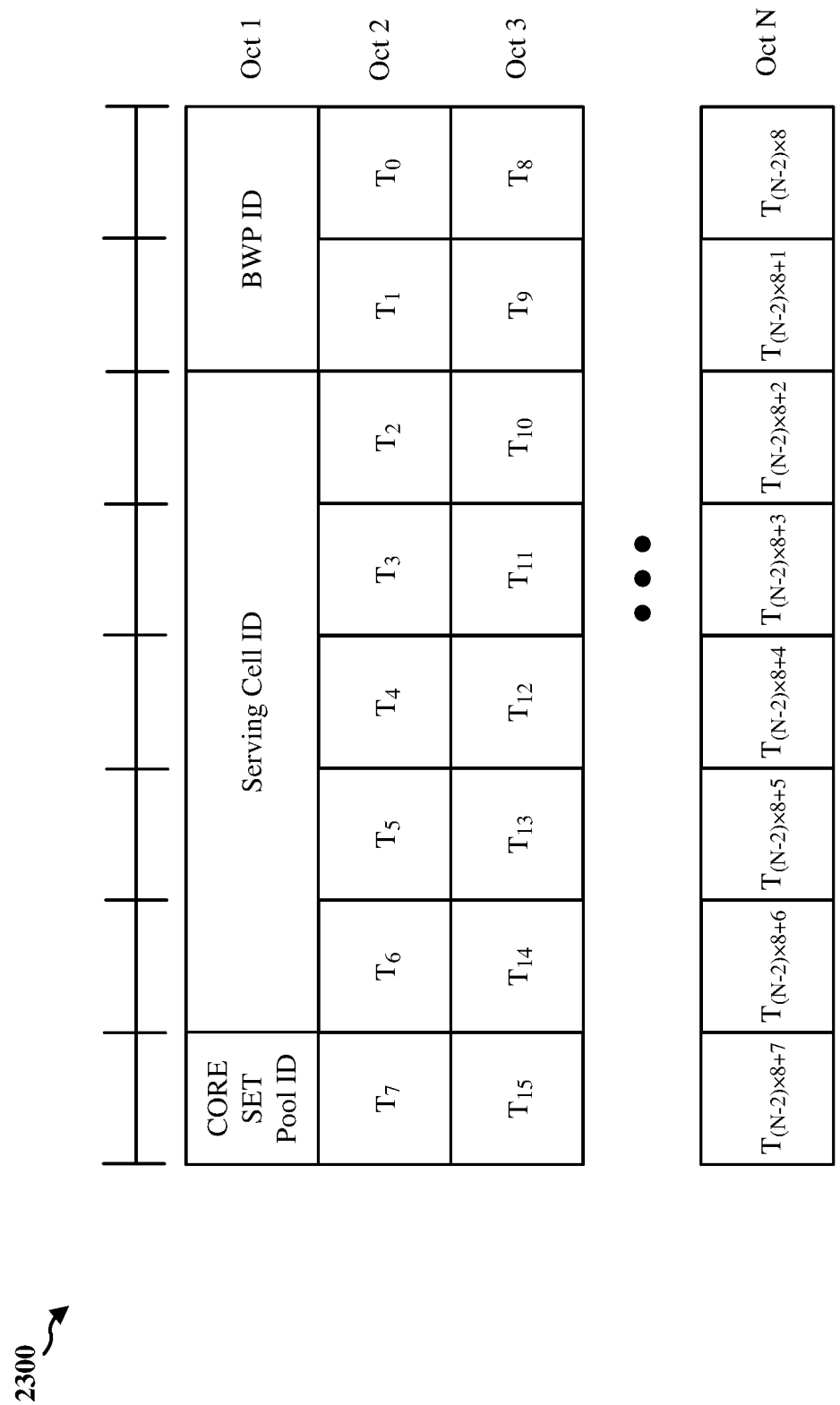
FIG. 23 illustrates exemplary additional TCI States Activation/Deactivation parameters.

FIG. 23 illustrates portions of a MAC subheader 2300 for TCI States Activation/Deactivation for UE-specific PDSCH MAC-CE, which is a feature of some 5G NR specifications. See, again, 3GPPP ETSI TS 138 321 specifications for Medium Access Control (MAC) Protocol Specification. The MAC subheader 2300 includes various fields, as shown, for listing the activation/deactivation status of TCI states along with a coreset pool ID, a serving cell ID, and a BWP ID. As discussed above, in some aspects, TCI states are updated, such as the TCI states listed in the MAC PDU 2300. The example MAC PDU 2300 in FIG. 23 may pertain to TCI states for mDCI described herein.

In some aspects, a base station (e.g., a gNB) schedules multiple reference signals, such as a CSI-RS, for a UE. The UE may perform one or more measurements of the CSI-RS. The corresponding TCI states for the CSI-RS resource sets correspond to beams from different TRPs. The UE identifies the TRP ID (CORESET pool index) of each CSI-RS resource set (1) based on which CORESET receives the scheduling DCI (e.g., for aperiodic CSI-RS) or activation DCI (e.g., for semi-persistent CSI-RS), where the CORESET pool ID associated with the receiving CORESET is the CORESET pool ID for the CSI-RS) or (2) based on the configuration of the CSI-RS resource set.

In some aspects, the base station schedules the UE to transmit a report based on the CSI-RS. The UE may report at least one group of two TCI states, where each TCI state is from a different TRP. The top K groups of TCI states automatically replace the TCI states corresponding to a certain TCI codepoint in current PDSCH configurations.

In the report, the UE may indicate the allowed MUX configuration (e.g., TDM, FDM, SDM) for each group of TCIs. The UE may further report the top K beams (e.g., TCI states). The UE may replace the TCI states in the PDSCH configuration along with the corresponding CORESET pool ID. The UE may also indicate whether the TCI state update has been automatically performed in the report.

In some aspects, the base station can schedule a PDSCH transmission based on the updated TCI state configuration by, for example, scheduling sDCI mTRP PDSCH or scheduling mDCI mTRP in a non-coherent joint transmission manner There may also be single TRP transmissions.

In some aspects, the base station can dynamically configure whether an autonomous TCI state updating feature is enabled or not so that a TCI state update is only performed when conditions are met. The conditions may be pre-defined or signaled to UE.

Still further, mechanisms or procedures for actually reporting an update of a TCI state are disclosed herein. In some aspects, the UE may report up to K beams (corresponding to K TCI states) with RSRP. For a downlink channel (e.g., PDSCH and/or PDCCH), up to N TCI states can be configured in the list, where K N is expected. Some of the reported TCI states may already be configured for the downlink channel (e.g., PDSCH and/or PDCCH). Rules may be set to specify which beam to autonomously update from the report.

In one example, the UE replaces the top K TCI states in the CSI report that is not currently configured. In another example, the UE replaces the TCI states that are not currently configured and are among the top K TCI states in the report. Rules also may be set specifying which beam is to be replaced in a list of TCI states. In one example, if the UE is configured with fewer than N TCI states, then the UE first tries to append the reported qualified TCI states in the TCI state list. Once the TCI list is full, the UE then replaces a current TCI state with the reported qualified TCI state based on a predefined rule, such as a rule specifying that the UE replace the current TCI state based on the order of its ID (also referred to as a TCI state ID). For example, the UE may replace a TCI state associated with a smallest TCI state ID (e.g., a TCI state ID number having the smallest value) first.

In some examples, each TCI state may be configured with a TCI state ID and quasi-colocation (QCL) information. The QCL information for a TCI state may include the source reference signal (RS) (e.g., CSI-RS) for the TCI state.

In some examples, a downlink channel configuration (e.g., a PDSCH configuration or a PDCCH configuration) may include a list of TCI states that may be used for the downlink channel. For example, if the list of TCI states is for PDSCH, the TCI states in the list can be used for PDSCH. In some examples, when scheduling CSI-RS, a TCI state may be indicated in the CSI-RS resource configuration.

In one example, a TCI state may be updated by replacing a TCI state ID in a PDSCH TCI state list with a TCI state ID associated with the reported CSI-RS resource. In another example, rather than changing a TCI state ID, the UE may revise the content of the TCI state configuration of the TCI state ID in a PDSCH TCI state list. For example, the UE may revise the reference signal (RS) in a QCL information block in the corresponding TCI state configuration to change it to the reported CSI-RS resource ID.

Referring briefly again to FIG. 1, in certain aspects, the UE 104 and base station 180 may be configured to control and coordinate autonomous updating by the UE of TCI states for use with mTRP (198). Although the following descriptions may focus on TCI states within mTRP 5G NR, the concepts described herein may be applicable to other similar areas, such as beam states for LTE, LTE-A, CDMA, GSM, and other wireless technologies with multiple receive and transmit points.

Figure 24:
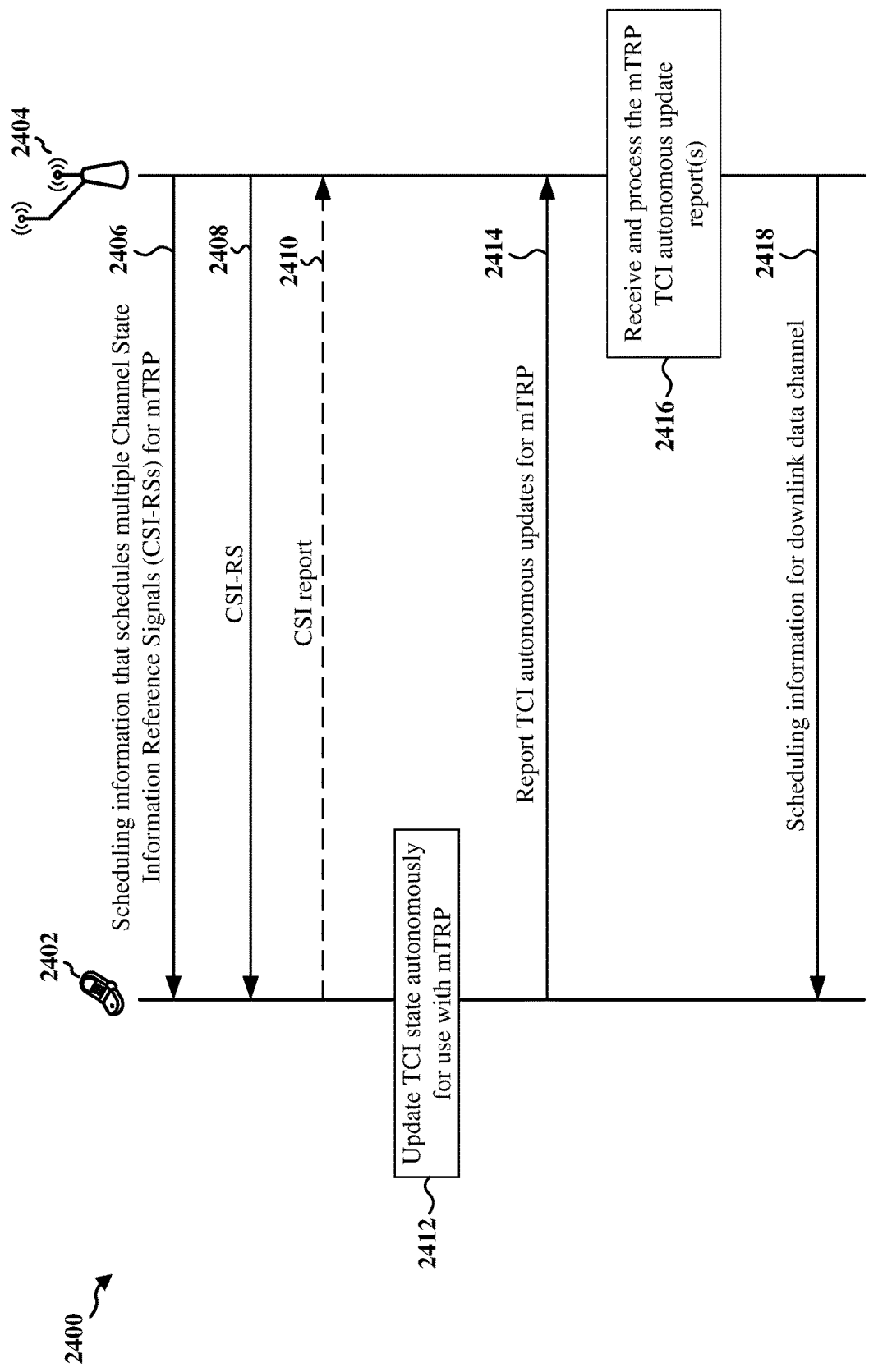
FIG. 24 provides an overview of a procedure that may be performed by a UE and a multiple transmit and receive point (mTRP) base station to control and coordinate autonomous TCI state updates.

FIG. 24 illustrates a procedure 2400 that may be performed by a UE 2402 and an mTRP base station 2404 to control and coordinate autonomous TCI state updates at the UE 2402 for mTRP. The mTRP base station 2404 transmits scheduling information 2406 that schedules multiple CSI-RSs and which may additionally configure or schedule responsive CSI-RS reports.

The mTRP base station 2404 may transmit a CSI-RS 2408 and the UE 2402 may perform one or more measurements of the CSI-RS 2408. The UE 2402 may optionally transmit a CSI report 2410 to the mTRP base station 2404.

At 2412, the UE 2402 autonomously updates a TCI state for use with mTRP. In some examples, the UE 2402 autonomously updates the TCI state at 2412 after the CSI report 2410. The UE transmits a report 2414 of autonomous updates of TCI states to the mTRP base station 2404. At 2416, the mTRP base station 2404 receives and processes the report 2414 of autonomous updates of TCI states. The mTRP base station 2404 may transmit scheduling information at 2418 for a downlink data channel (e.g., PDSCH) based on the report 2414 of autonomous updates of TCI states.

Figure 25:
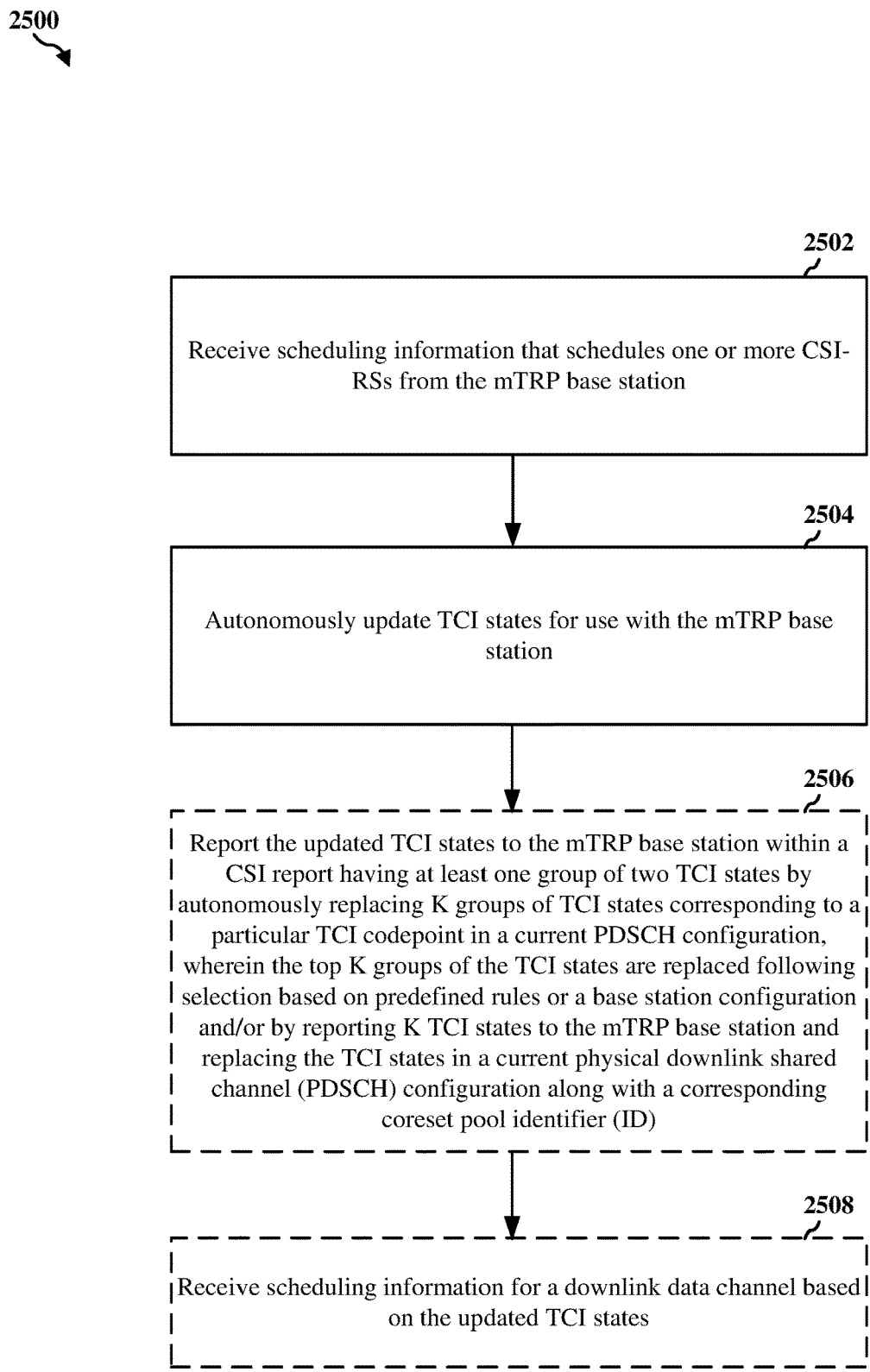
FIG. 25 illustrates a procedure that may be performed by a UE to perform and report autonomous TCI state updates to an mTRP base station.

FIG. 25 is a flowchart 2500 of a method of wireless communication. The method may be performed by a UE (e.g., the UE 104, 2402; the apparatus 2702/2702'; the processing system 2814, which may include the memory 360 and which may be the entire UE 104, 2402 or a component of the UE 104, 2402 such as the TX processor 368, the RX processor 356, and/or the controller/processor 359).

At 2502, the UE receives scheduling information that schedules one or more CSI-RSs from the mTRP base station. For example, at 2406 in FIG. 24, the UE 2402 receives scheduling information that schedules one or more CSI-RSs from the mTRP base station 2404. The scheduling information 2406 may additionally configure or schedule responsive CSI-RS reports, such as report 2410 of FIG. 24.

At 2504, the UE autonomously updates TCI states for use with the mTRP base station. In some examples, the UE may autonomously update the TCI states for use with the mTRP base station by identifying an indication of the associated TRP for each of the CSI-RS resource sets based on which CORESET receives a DCI, where the DCI is a scheduling DCI for an aperiodic CSI-RS (AP-CSI-RS) or an activation DCI for a semi-persistent CSI-RS (SP-CSI-RS) and wherein the indication of TRP is CORESET pool index, the CORESET pool ID associated with the receiving CORESET is the CORESET pool ID for the CSI-RS, and also identifying an indication of the associated TRP for each of the CSI-RS resource sets based on the configuration of the CSI-RS resource set.

For example, at 2412 in FIG. 24, the UE 2402 may autonomously update the TCI states for use with the mTRP base station 2404 by identifying an indication of the associated TRP for each of the CSI-RS resource sets. In some examples, the UE 2402 of FIG. 4 autonomously updates the TCI states for use with the mTRP base station 2404 by identifying an indication of the associated TRP for each of the CSI-RS resource sets 2408 based on which CORESET receives a DCI, where the DCI is a scheduling DCI for an aperiodic CSI-RS (AP-CSI-RS) or an activation DCI for a semi-persistent CSI-RS (SP-CSI-RS) and wherein the indication of TRP is CORESET pool index, the CORESET pool ID associated with the receiving CORESET is the CORESET pool ID for the CSI-RS, and also identifying an indication of the associated TRP for each of the CSI-RS resource sets based on the configuration of the CSI-RS resource set 2408.

At 2506, the UE reports the updated TCI states to the mTRP base station within a CSI report having at least one group of two TCI states by autonomously replacing K groups of TCI states corresponding to a particular TCI codepoint in a current PDSCH configuration, wherein the top K groups of the TCI states are replaced following selection based on predefined rules or a base station configuration and/or by reporting K TCI states to the mTRP base station and replacing the TCI states in a current physical downlink shared channel (PDSCH) configuration along with a corresponding coreset pool identifier (ID).

In some examples, the UE may report the updated TCI states to the mTRP base station within a CSI report while reporting an allowed multiplexing (MUX) configuration for each of the groups of TCIs, where the MUX configuration indicates one or more of time division multiplexing (TDM), frequency divisions multiplexing (FDM), or spatial division multiplexing (SDM), or where (a) the UE reports the autonomous update to the mTRP base station by replacing a TCI state ID in a PDSCH TCI state list with a TCI state ID associated with a reported CSI-RS resource, (b) the UE reports the autonomous update to the mTRP base station by revising content of a TCI state configuration ID in a PDSCH TCI state list to reflect a TCI state ID associated with a reported CSI-RS resource and/or (c) revises the content by revising a reference signal in a QCL information field of the corresponding TCI state configuration to reflect a TCI state ID associated the reported CSI-RS resource ID. For example, at 2414 in FIG. 24, the UE 2402 reports the updated TCI states to the mTRP base station 2404 using one of the above-described techniques, such as by autonomously replacing K groups of TCI states corresponding to a particular TCI codepoint in a current PDSCH configuration.

At 2508, the UE receives scheduling information for a downlink data channel based on the updated TCI states. In some examples, the downlink data channel may be a PDSCH and the scheduling information may schedule sDCI for an mTRP PDSCH or schedule mDCI for an mTRP PDSCH for a non-coherent joint transmission, and where corresponding TCI states for CSI-RS resource sets can correspond to beams from different TRPs of the mTRP base station.

For example, at 2418 in FIG. 24, the UE 2402 receives scheduling information for a downlink data channel from a base station 2404 based on the updated TCI states where, for example, the scheduling information schedules sDCI for an mTRP PDSCH or schedules mDCI for an mTRP PDSCH for a non-coherent joint transmission.

Figure 26:
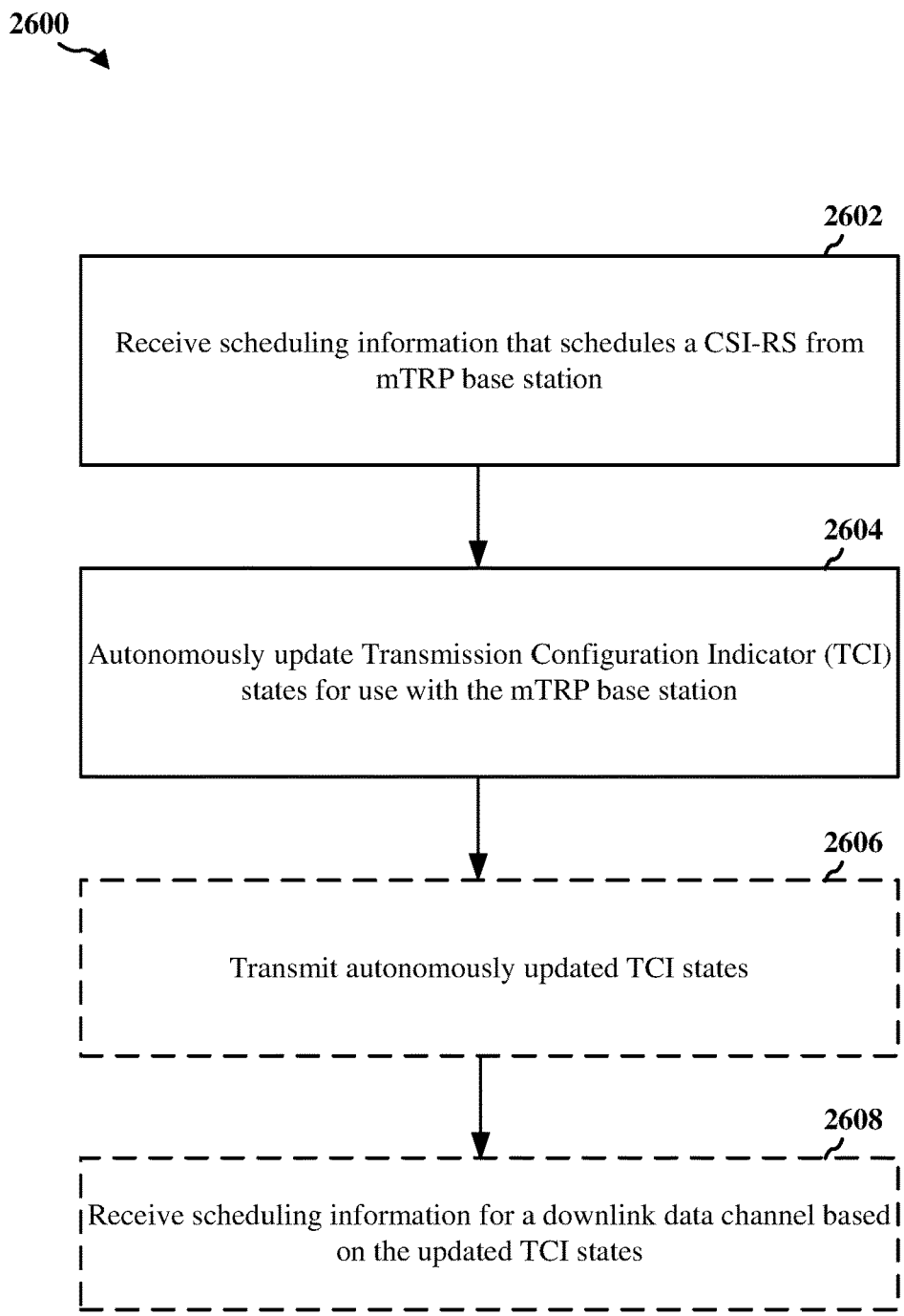
FIG. 26 illustrates a procedure that may be performed by a UE to perform and report autonomous TCI state updates to an mTRP base station.

FIG. 26 is a flowchart 2600 of a method of wireless communication. The method may be performed by a UE (e.g., the UE 104, 2402; the apparatus 2702/2702'; the processing system 2814, which may include the memory 360 and which may be the entire UE 104, 2402 or a component of the UE 104, 2402 such as the TX processor 368, the RX processor 356, and/or the controller/processor 359). In FIG. 26, operations indicated with dashed lines represent optional operations.

At 2602, the UE receives scheduling information that schedules one or more CSI-RSs from the mTRP base station. For example, at 2418 in FIG. 24, the UE 2402 receives scheduling information that schedules one or more CSI-RSs from the mTRP base station 2404. The scheduling information 2406 may additionally configure or schedule responsive CSI-RS reports, such as report 2410 of FIG. 24.

At 2604, the UE autonomously updates TCI states for use with the mTRP base station. For example, at 2412 in FIG. 24, the UE 2402 may autonomously update the TCI states for use with the mTRP base station 2404 by identifying an indication of the associated TRP for each of the CSI-RS resource sets.

At 2606, the UE transmits the autonomously updated TCI states to the mTRP base station. For example, at 2414 in FIG. 24, the UE 2402 reports the updated TCI states to the mTRP base station 2404. In some examples, the UE 2402 autonomously updates the TCI states for use with the mTRP base station 2404 by identifying an indication of the associated TRP for each of the CSI-RS resource sets based on which CORESET receives a DCI, where the DCI is a scheduling DCI for an aperiodic CSI-RS (AP-CSI-RS) or an activation DCI for a semi-persistent CSI-RS (SP-CSI-RS) and wherein the indication of TRP is CORESET pool index, the CORESET pool ID associated with the receiving CORESET is the CORESET pool ID for the CSI-RS, and also identifying an indication of the associated TRP for each of the CSI-RS resource sets based on the configuration of the CSI-RS resource set.

At 2608, the UE receives scheduling information for a downlink data channel based on the updated TCI states.

For example, at 2418 in FIG. 24, the UE 2402 receives scheduling information for a downlink data channel from a base station 2404 based on the updated TCI states where, for example, the scheduling information schedules sDCI for an mTRP PDSCH or schedules mDCI for an mTRP PDSCH for a non-coherent joint transmission.

Figure 27:
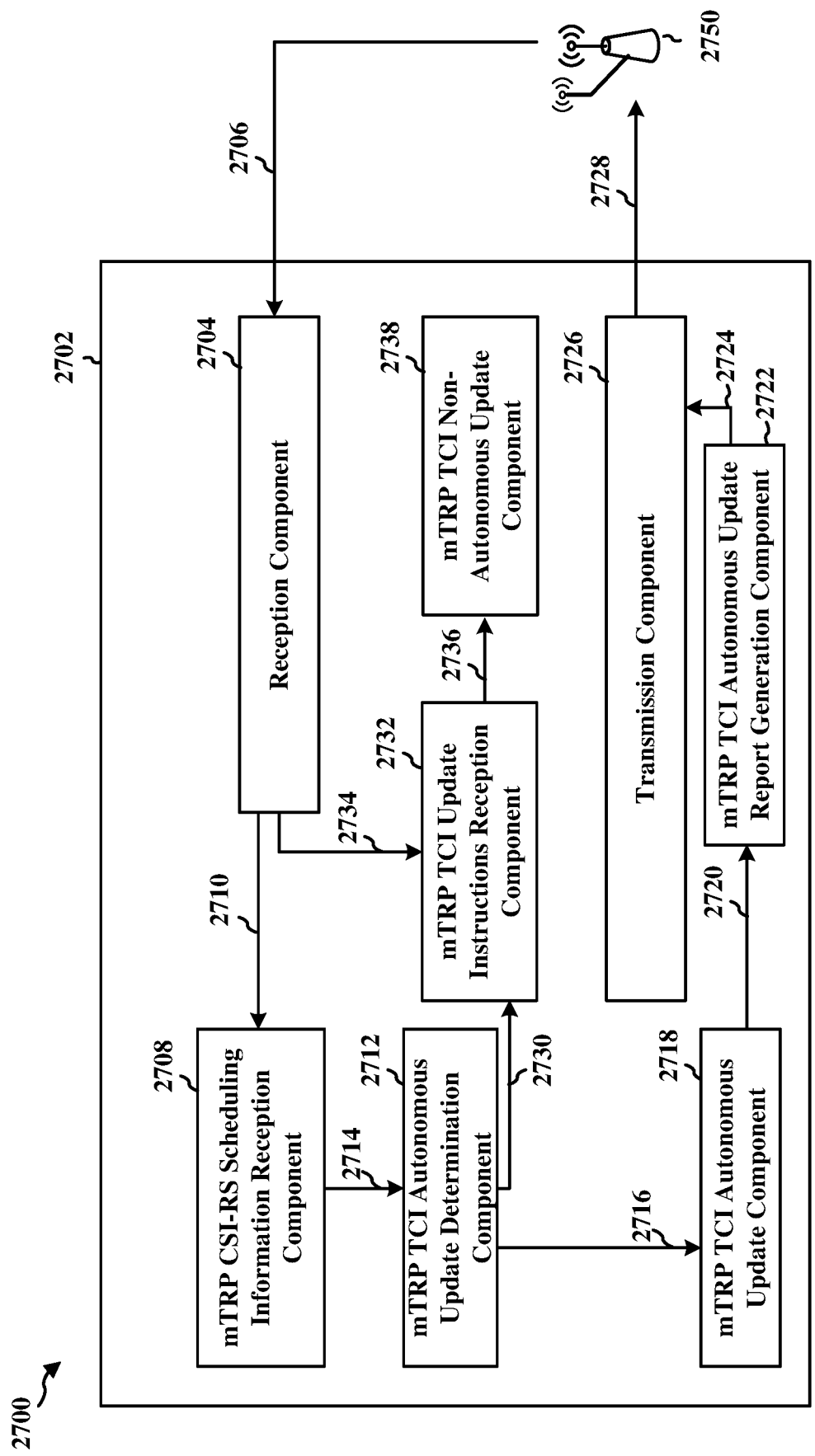
FIG. 27 is a conceptual data flow diagram illustrating the data flow between different means/components in an example apparatus, such as a UE.

FIG. 27 is a conceptual data flow diagram 2700 illustrating the data flow between different means/components in an example apparatus 2702. The apparatus may be a UE. The apparatus includes a reception component 2704 that receives downlink signals 2706 from an mTRP base station 2750, which may include CSI-RS scheduling signals and information pertaining to current TCI states. The scheduling signals may schedule multiple CSI-RS for UE to measure. As described herein, the corresponding TCI states for the CSI-RS resource sets correspond to beams from different TRPs. The UE identifies the TRP ID (CORESET pool index) of each CSI-RS resource set (1) based on which CORESET receives the scheduling DCI (for AP-CSI-RS)/activation DCI (for SP CSI-RS (where the CORESET pool ID associated with the receiving CORESET is the CORESET pool ID for the CSI-RS) or (2) based on the configuration of the CSI-RS resource set. In some aspects, the base station can schedule PDSCH transmission based on the updated TCI configuration by, for example, scheduling an sDCI mTRP PDSCH or scheduling an mDCI mTRP in a non-coherent joint transmission manner There may also be single TRP transmissions.

The apparatus 2702 includes an mTRP CSI-RS scheduling information reception component 2708 that receives mTRP CSI-RS scheduling signals and TCI state information 2710 from the reception component 2704 and decodes the signals or parses the data, if needed. The apparatus further 2702 includes an mTRP TCI autonomous update determination component 2712 that receives the signals/data 2714 and determines whether to perform an autonomous update of a TCI state. The determination may be made based on various conditions, rules, and measured parameters.

If the mTRP TCI autonomous update determination component 2712 determines to autonomously update a TCI state, the mTRP TCI autonomous update determination component 2712 transmits a suitable control signal 2716 to an mTRP TCI autonomous update component 2718, along with current TCI state information, and the mTRP TCI autonomous update component 2718 updates the TCI using one or more of the procedures described herein. As explained, in some examples, a TCI state is updated by (1) replacing a TCI state ID in the PDSCH TCI state list with a TCI state ID associated with the reported CSI-RS resource; or (2) rather than changing TCI state ID, the UE revises the content of the TCI state configuration of the TCI state ID in the PDSCH list such as by revising the reference signal in a QCL information block in the corresponding TCI state configuration to change it to the reported CSI-RS resource ID.

The apparatus 2702 further includes an mTRP TCI autonomous update report generation component 2722 that receives updated mTRP TCI information 2720 from the mTRP TCI autonomous update component 2718. The mTRP TCI autonomous update report generation component 2722 generates a report for transmission to the mTRP base station, which may include a CSI report configured to report the updated TCI. The mTRP TCI autonomous update report generation component 2722 forwards the report 2724 to a transmission component 2726, which transmits the report 2724 to the mTRP base station 2750.

The mTRP TCI autonomous update report generation component 2722 may report up to K beams (corresponding to K TCI states) with RSRP. For PDSCH/PDCCH, up to N TCI states can be configured in the list (where KEN is expected). Some of the reported TCI states may already configured for PDSCH/PDCCH. Rules may be set to specify which beam to autonomously update from the report. In one example, the UE replaces the top K TCI states in the report that is not currently configured. In another example, the UE replaces the TCI states that (i) not currently configured and (ii) among the top K in the report. Rules also may be set specifying which beam is to be replaced in a list of TCI states. In one example, if the UE is configured with fewer than N TCI states, then the UE first tries to append the reported qualified TCIs in the TCI state list. One the TCI list is full, the UE then replaces a current TCI state with the reported qualified TCI state based on a predefined rule, such as a rule specifying that the UE replace the current TCI state based on the order of its ID, e.g. by replacing the TCI state with smallest number first.

Note that in some examples, each TCI state is configured with a TCI state ID, and QCL information lists the source RS for this TCI state. For example, in PDSCH-config., a list of TCI states may be configured (similarly in PDCCH). The TCI states in the list can be used for PDSCH. Also when scheduling CSI-RS, a TCI state may be indicated in the CSI-RS resource configuration. Accordingly, in some examples, a TCI state is updated by (1) replacing a TCI state ID in the PDSCH TCI state list with a TCI state ID associated with the reported CSI-RS resource; or (2) rather than changing TCI state ID, the UE revises the content of the TCI state configuration of the TCI state ID in the PDSCH list such as by revising the reference signal in a QCL information block in the corresponding TCI state configuration to change it to the reported CSI-RS resource ID.

If the mTRP TCI autonomous update determination component 2712 determines not to autonomously update a TCI state, the mTRP TCI autonomous update determination component 2712 transmits a suitable control signal 2730 to a TCI update instruction reception component 2732, which awaits receipt of instructions 2734 from the mTRP base station 2750 via reception component 2704 to (non-autonomously) update the TCI states maintained within the UE. The instructions are relayed (1736) to a TCI non-autonomous update component 2738, which updates the TCI states within the UE based on the instructions.

The apparatus may include additional components that perform each of the blocks of the UE-side algorithm in the aforementioned flowcharts of FIGS. 25 and 26. As such, each UE-side block in the aforementioned flowcharts of FIGS. 25 and 26 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 28:
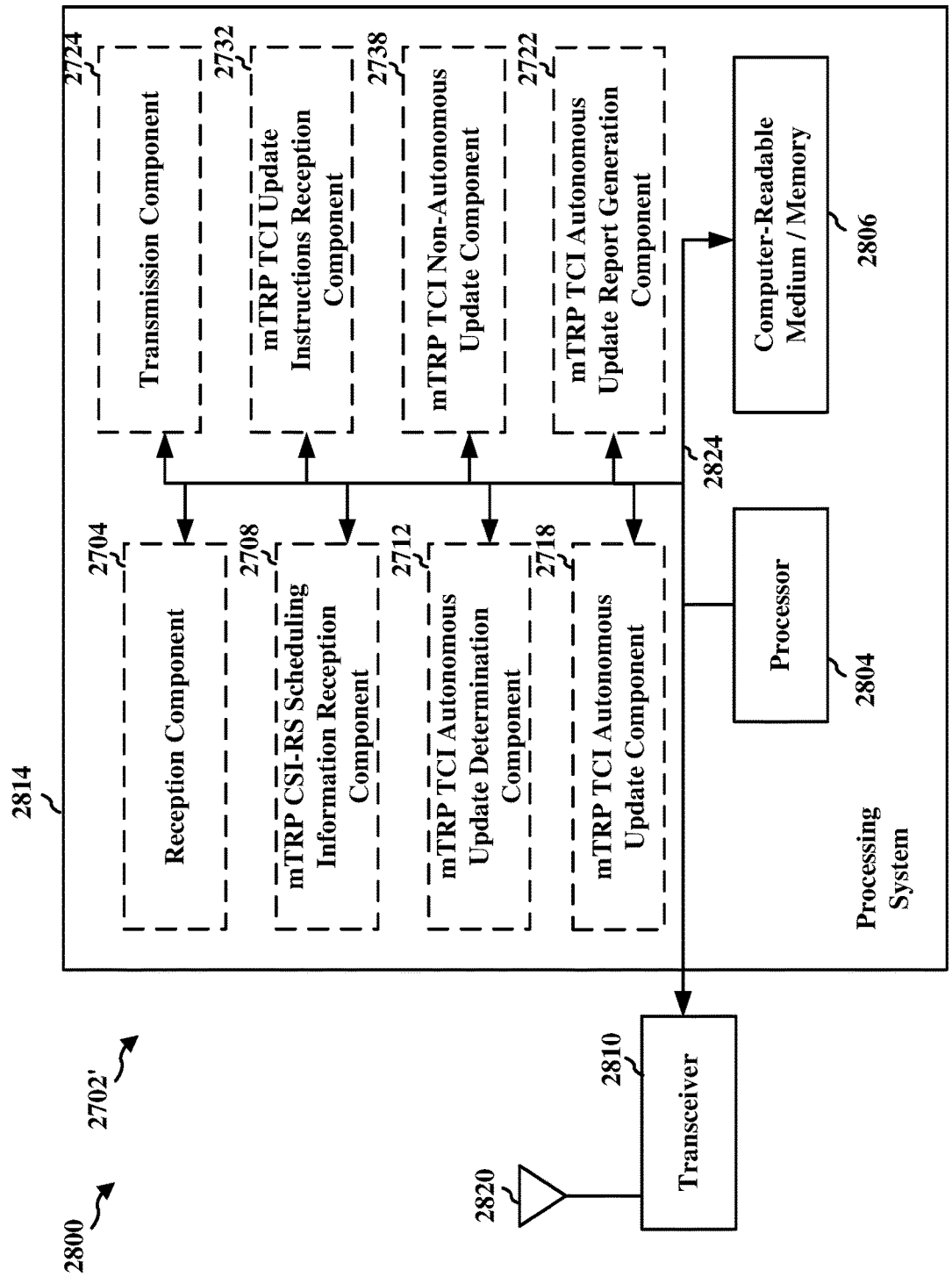
FIG. 28 is a diagram illustrating an example of a hardware implementation for an apparatus, such as a UE, employing a processing system.

FIG. 28 is a diagram 2800 illustrating an example of a hardware implementation for an apparatus 2702' employing a processing system 2814. The processing system 2814 may be implemented with a bus architecture, represented generally by the bus 2824. The bus 2824 may include any number of interconnecting buses and bridges depending on the specific application of the processing system 2814 and the overall design constraints. The bus 2824 links together various circuits including one or more processors and/or hardware components, represented by the processor 2804, the components 2704, 2708, 2712, 2718, 2722, 2724, 2732, 2738 and the computer-readable medium/memory 2806. The bus 2824 may also link various other circuits such as timing sources, peripherals, voltage regulators, and power management circuits, which are well known in the art, and therefore, will not be described any further.

The processing system 2814 may be coupled to a transceiver 2810. The transceiver 2810 is coupled to one or more antennas 2820. The transceiver 2810 provides a means for communicating with various other apparatus over a transmission medium. The transceiver 2810 receives a signal from the one or more antennas 2820, extracts information from the received signal, and provides the extracted information to the processing system 2814, specifically the reception component 2704. In addition, the transceiver 2810 receives information from the processing system 2814, specifically the transmission component 2724, and based on the received information, generates a signal to be applied to the one or more antennas 2820. The processing system 2814 includes a processor 2804 coupled to a computer-readable medium/memory 2806. The processor 2804 is responsible for general processing, including the execution of software stored on the computer-readable medium/memory 2806. The software, when executed by the processor 2804, causes the processing system 2814 to perform the various functions described supra for any particular apparatus. The computer-readable medium/memory 2806 may also be used for storing data that is manipulated by the processor 2804 when executing software. The processing system 2814 further includes at least one of the components 2704, 2708, 2712, 2718, 2722, 2724, 2732, 2738. The components may be software components running in the processor 2804, resident/stored in the computer readable medium/memory 2806, one or more hardware components coupled to the processor 2804, or some combination thereof.

In one configuration, the apparatus 2702/2702' for wireless communication includes: means for receiving scheduling information from an mTRP base station that schedules a CSI-RS; and means for autonomously updating TCI states for use with the mTRP base station.

The aforementioned means may be one or more of the aforementioned components of the apparatus 2702 and/or the processing system 2814 of the apparatus 2702' configured to perform the functions recited by the aforementioned means. As described supra, the processing system 2814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 29:
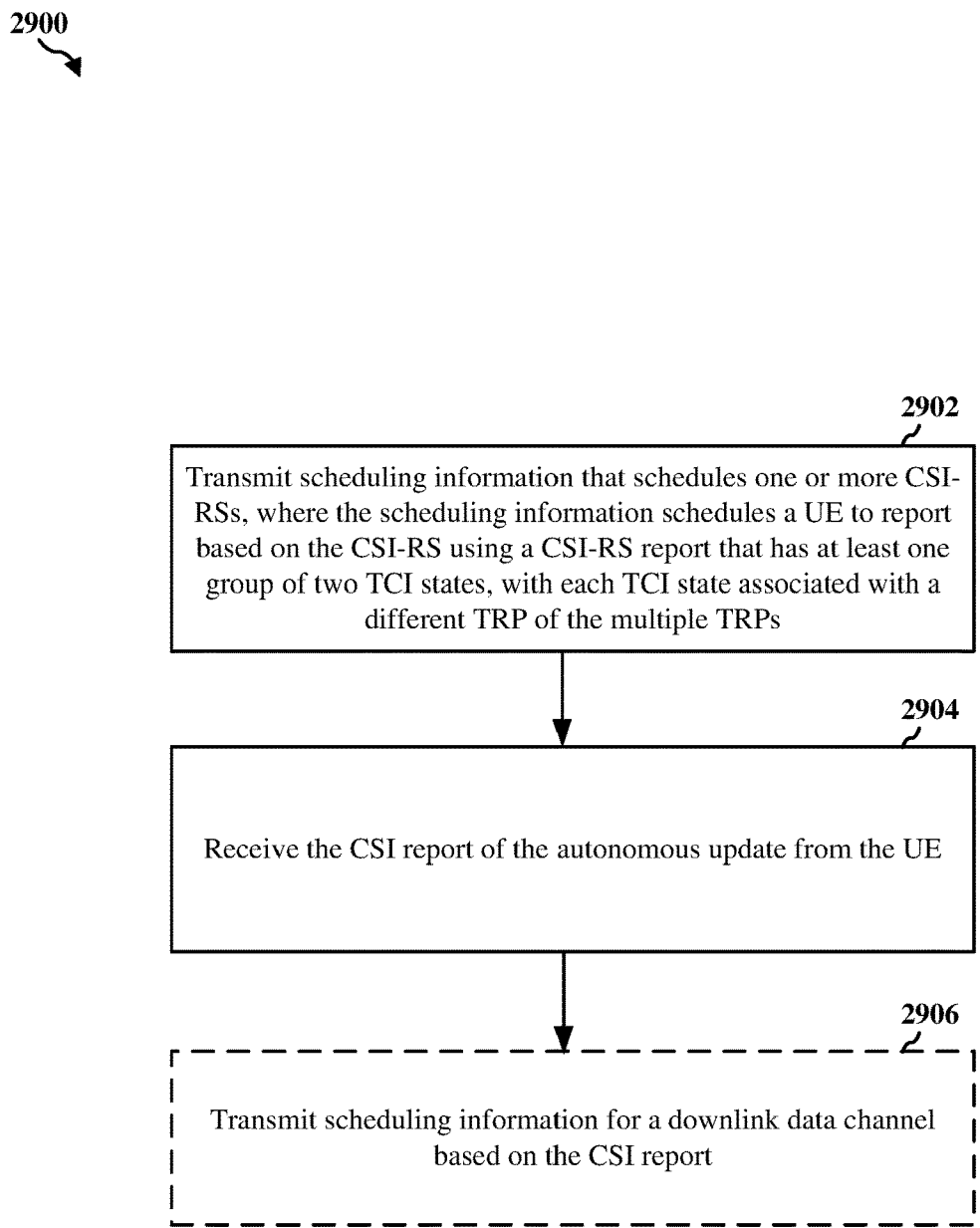
FIG. 29 is a flowchart of a method of wireless communication for an mTRP base station.

FIG. 29 is a flowchart 2900 of a method of wireless communication. The method may be performed by an mTRP base station (e.g., the mTRP base station 2404; the apparatus 3102/3102'; the processing system 3214, which may include the memory 376 and which may be the entire mTRP base station 2404 or a component of the mTRP base station 2404, such as the TX processor 316, the RX processor 370, and/or the controller/processor 375). In FIG. 29, operations indicated with dashed lines represent optional operations.

At 2902, the mTRP base station transmits scheduling information that schedules one or more CSI-RSs, where the scheduling information schedules a UE to report based on the CSI-RS using a CSI-RS report that has at least one group of two TCI states, with each TCI state associated with a different TRP of the multiple TRPs.

For example, at 2406 in FIG. 24, the mTRP base station 2404 transmits scheduling information to the UE 2402 that schedules one or more CSI-RSs, where the scheduling information schedules the UE 2402 to report based on the CSI-RS using a CSI-RS report that has at least one group of two TCI states, with each TCI state associated with a different TRP of the multiple TRPs. The scheduling information 2406 may additionally configure or schedule responsive CSI-RS reports, such as report 2410 of FIG. 24.

At 2904, the mTRP base station receives the CSI report of the autonomous update from the UE. In some examples, the CSI report includes at least one group of two TCIs, with each TCI associated with a different TRP of the multiple TRPs, and includes autonomous replacement by the UE of K groups of TCI states corresponding to a particular TCI codepoint in a current PDSCH configuration, where the top K groups of the TCI states are replaced following selection based on predefined rules or a base station configuration.

For example, at 2410 in FIG. 24, the mTRP base station 2404 receives a CSI report of the autonomous update from the UE 2402. As explained, the CSI report may have at least one group of two TCI states wherein the top K groups of the TCI states have been replaced following selection based on predefined rules.

At 2906, the mTRP base station transmits scheduling information for a downlink data channel based on the CSI report of 2904.

For example, at 2418 in FIG. 24, the mTRP base station 2404 transmits scheduling information for a downlink data channel based on a CSI report received from the UE 2402. For example, the scheduling information may schedule sDCI for an mTRP PDSCH or schedule mDCI for an mTRP PDSCH for a non-coherent joint transmission.

Figure 30:
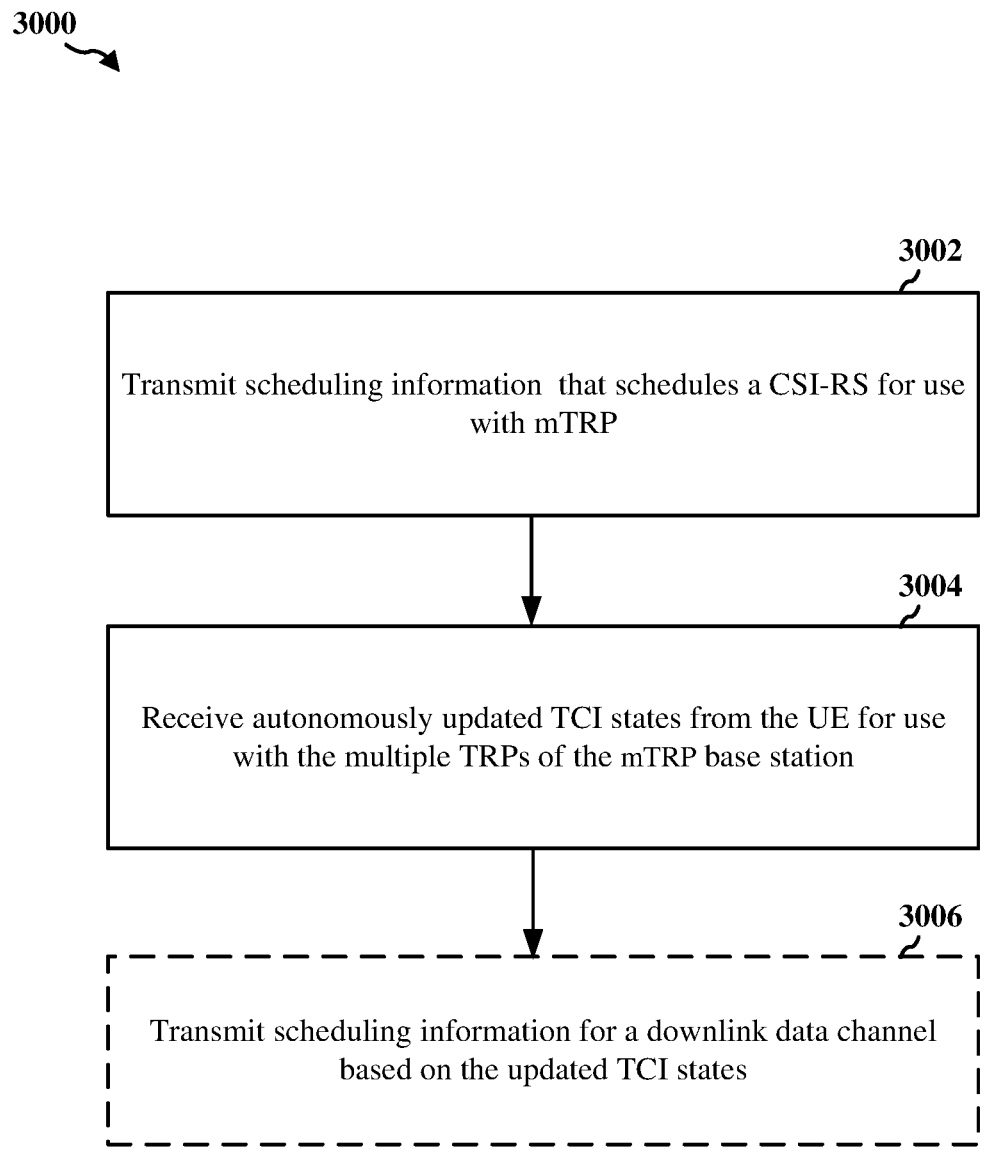
FIG. 30 is a flowchart of another method of wireless communication for an mTRP base station.

FIG. 30 is a flowchart 3000 of a method of wireless communication. The method may be performed by an mTRP base station (e.g., the mTRP base station 2404; the apparatus 3102/3102'; the processing system 3214, which may include the memory 376 and which may be the entire mTRP base station 2404 or a component of the mTRP base station 2404, such as the TX processor 316, the RX processor 370, and/or the controller/processor 375). In FIG. 30, operations indicated with dashed lines represent optional operations.

At 3002, the mTRP base station transmits scheduling information that schedules a CSI-RS for use with mTRP. For example, at 2406 in FIG. 24, the mTRP base station 2404 transmits scheduling information to the UE 2402 that schedules one or more CSI-RSs. For example, the scheduling information may schedule the UE 2402 to report using a CSI-RS report that has at least one group of two TCI states, with each TCI state associated with a different TRP of the multiple TRPs.

At 3004, the mTRP base station receives autonomously updated TCI states from the UE for use with the multiple TRPs of the mTRP base station. For example, at 2410 in FIG. 24, the mTRP base station 2404 receives a CSI report at 2414 of the autonomous update from the UE 2402. The CSI report may have at least one group of two TCI states wherein the top K groups of the TCI states have been replaced following selection based on predefined rules.

At 3006, the mTRP base station transmits scheduling information for a downlink data channel based on the updated TCI states. For example, at 2418 in FIG. 24, the mTRP base station 2404 transmits scheduling information for a downlink data channel based on the CSI report received from the UE 2402 at 2414. The downlink data channel may be, for example, a PDSCH.

Figure 31:
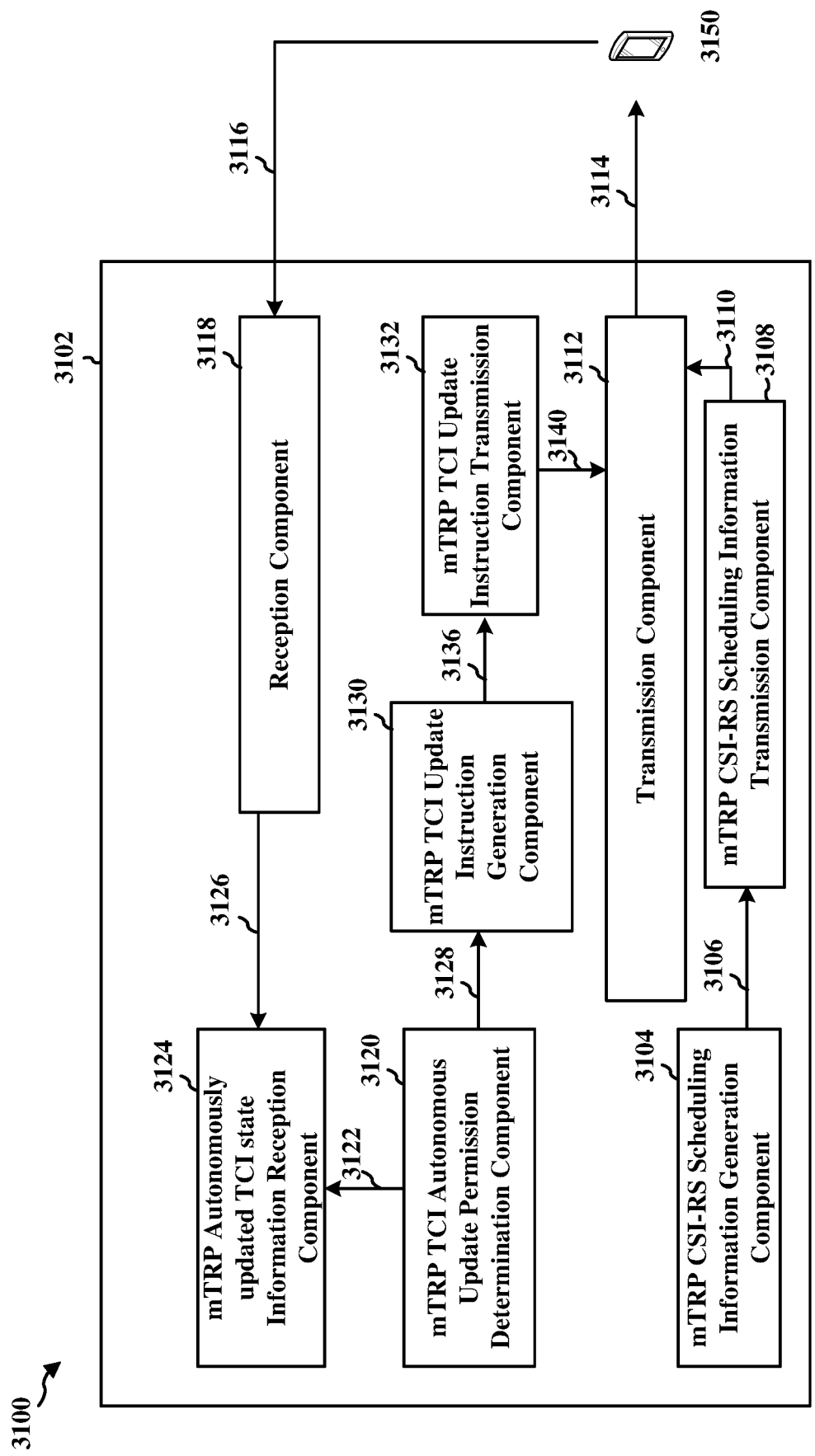
FIG. 31 is a conceptual data flow diagram illustrating the data flow between different means/components in an example apparatus, such as a base station (e.g., mTRP base station).

FIG. 31 is a conceptual data flow diagram 3100 illustrating the data flow between different means/components in an example apparatus 3102. The apparatus may be an mTRP base station. The apparatus includes an mTRP CSI-RS scheduling information generation component 3104 that generates scheduling information that schedules a CSI-RS for a UE (e.g., UE 3150). The mTRP CSI-RS scheduling information generation component 3104 transmits the scheduling information 3106 to an mTRP CSI-RS scheduling information transmission component 3108. The mTRP CSI-RS scheduling information transmission component 3108 provides the scheduling information 3110 (properly formatted as a suitable downlink signal) to a transmission component 3112, which transmits the scheduling information as a downlink signal 3114 to a UE 3150. The scheduling of mTRP is described herein. The apparatus further includes a reception component 3115 that receives uplink signals 3116 from the UE 3150.

The apparatus further includes an mTRP TCI autonomous update permission determination component 3120 that determines whether the UE 3150 is permitted to autonomously update a TCI state in response to the scheduled CSI-RS. If the UE 3150 is permitted to perform an autonomous update of a TCI state, the mTRP TCI autonomous update permission determination component 3120 transmits a suitable control signal 3122 to an mTRP autonomously updated TCI state information reception component 3124, which awaits receipt of a report 3126 (e.g., a CSI report) from the UE 3150 via the reception component 3118 of the autonomously updated TCI state. The reporting for mTRP autonomously updated TCI state is described above.

If the UE 3150 is not permitted to perform an autonomous update of TCI, then the mTRP TCI autonomous update permission determination component 3120 transmits a suitable control signal 3128 to an mTRP TCI update instruction generation component 3130 that generates TCI state update instructions 3136, which are transmitted to an mTRP TCI update instruction transmission component 3132 for transmission to the UE 3150 via the transmission component 3112 as downlink signals 3114.

The apparatus may include additional components that perform each of the blocks of the base station-side algorithm in the aforementioned flowcharts of FIGS. 29 and 30. As such, each base station-side block in the aforementioned flowcharts of FIGS. 29 and 30 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 32:
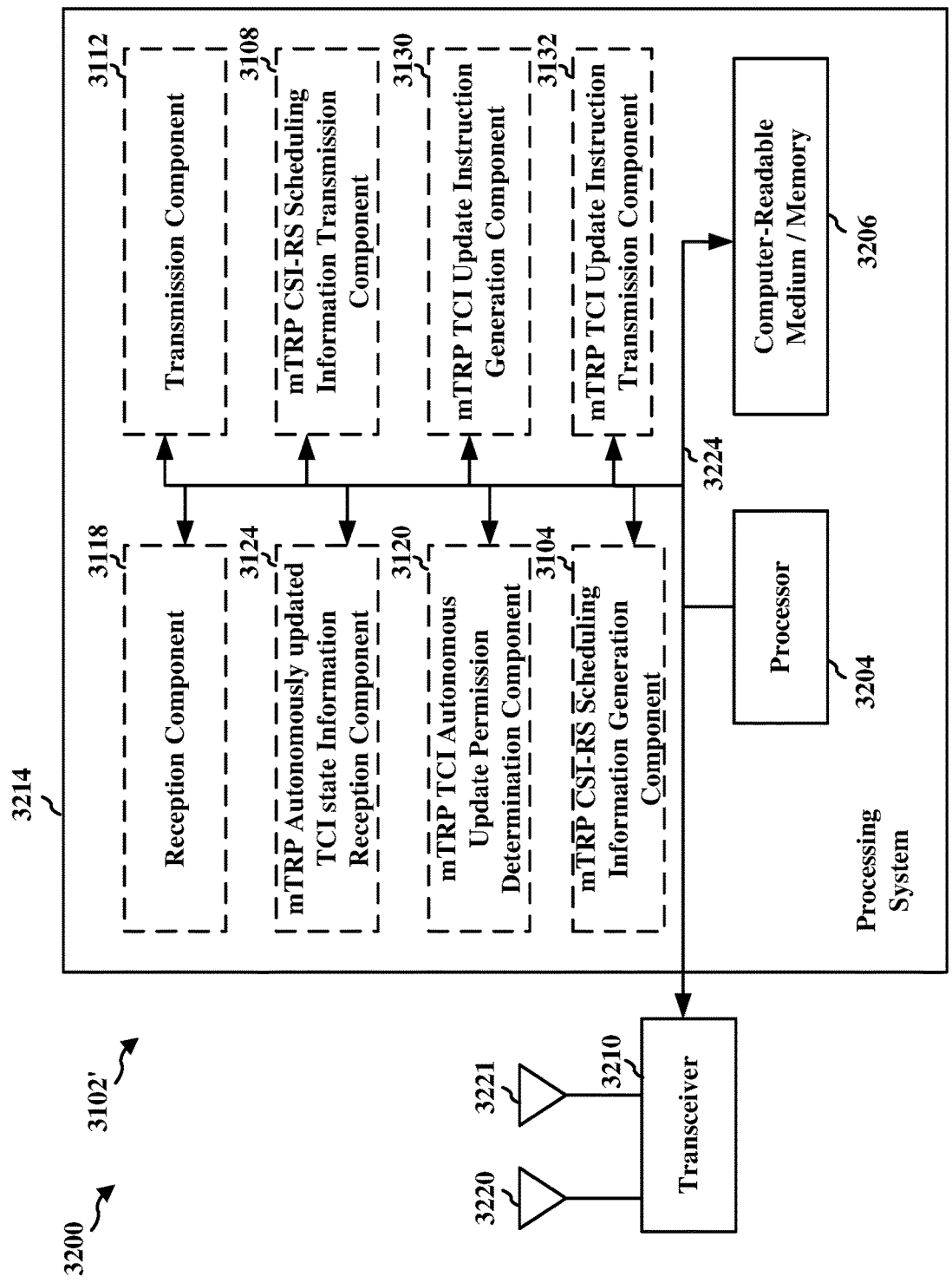
FIG. 32 is a diagram illustrating an example of a hardware implementation for an apparatus, such as a base station, employing a processing system.

FIG. 32 is a diagram 3200 illustrating an example of a hardware implementation for an apparatus 3102' employing a processing system 3214. The processing system 3214 may be implemented with a bus architecture, represented generally by the bus 3224. The bus 3224 may include any number of interconnecting buses and bridges depending on the specific application of the processing system 3214 and the overall design constraints. The bus 3224 links together various circuits including one or more processors and/or hardware components, represented by the processor 3204, the components 3104, 3108, 3112, 3118, 3120, 3124, 3130, 3132, and the computer-readable medium/memory 3206. The bus 3224 may also link various other circuits such as timing sources, peripherals, voltage regulators, and power management circuits, which are well known in the art, and therefore, will not be described any further.

The processing system 3214 may be coupled to a transceiver 3210. The transceiver 3210 is coupled to one or more antennas 3220 and 3221 (with two antennas shown to illustrate that the transceiver is configured for mTRP). The transceiver 3210 provides a means for communicating with various other apparatus over a transmission medium. The transceiver 3210 receives a signal from the one or more antennas 3220, extracts information from the received signal, and provides the extracted information to the processing system 3214, specifically the reception component 3118. In addition, the transceiver 3210 receives information from the processing system 3214, specifically the transmission component 3112, and based on the received information, generates a signal to be applied to the one or more antennas 3220. The processing system 3214 includes a processor 3204 coupled to a computer-readable medium/memory 3206. The processor 3204 is responsible for general processing, including the execution of software stored on the computer-readable medium/memory 3206. The software, when executed by the processor 3204, causes the processing system 3214 to perform the various functions described supra for any particular apparatus. The computer-readable medium/memory 3206 may also be used for storing data that is manipulated by the processor 3204 when executing software. The processing system 3214 further includes at least one of the components 3104, 3108, 3112, 3118, 3120, 3124, 3130, 3132. The components may be software components running in the processor 3204, resident/stored in the computer readable medium/memory 3206, one or more hardware components coupled to the processor 3204, or some combination thereof.

The processing system 3214 may be a component of the base station 3200 and may include the memory 376 and/or at least one of the TX processor 316, the RX processor 370, and the controller/processor 375. Alternatively, the processing system 3214 may be the entire base station (e.g., see, base station 270 of FIG. 3).

In one configuration, the apparatus 3102/3102' for wireless communication includes means for transmitting scheduling information to a UE that schedules a CSI-RS for use with mTRP; and means for receiving autonomously updated TCI states from the UE for use with the multiple TRPs of the base station.

The aforementioned means may be one or more of the aforementioned components of the apparatus 3102 and/or the processing system 3214 of the apparatus 3102' configured to perform the functions recited by the aforementioned means. As described supra, the processing system 3214 may include the TX Processor 276, the RX Processor 370, and the controller/processor 375. As such, in one configuration, the aforementioned means may be the TX Processor 276, the RX Processor 370, and the controller/processor 375 configured to perform the functions recited by the aforementioned means.

Thus systems, methods, apparatus, etc., are described herein that, among other features, set forth conditions and rules for controlling and coordinating autonomous TCI state updates by a UE for use with mTRP. Among other advantages, latency may be reduced and system performance enhanced. The methods are applicable to P/SP/AP CSI.

Still further, in some aspects, the following features or consideration are provided that pertain to or relate to conditions for autonomously updating a TCI state for use with mTRP. A rule may be defined indicating how to map reported beams to TCI states in a codepoint for mTRP, e.g. in sDCI and mDCI cases.

In some aspects, the UE may receive from/transmit to beams from multiple TRPs in different locations. This may help to improve spatial diversity against blockages. In some examples, up to 2 TRPs are considered. Transmissions from different TRPs can be scheduled by a sDCI from one TRP or for mDCI. PDSCH transmissions from different TRPs can be TDM/FDM/SDM. DCI may also indicate how to multiplex.

In some aspects, in sDCI scheduling, a codepoint consisting of up to 2 TCIs (each TCI from one TRP) is indicated in the DCI. Each PDSCH TCI state in the PDSCH configuration can be also assigned with a CORESET pool ID. In mDCI cases, if the PDSCH TCI state is configured with a CORESET pool ID, the PDSCH TCI state can be only scheduled by a DCI received in a CORESET using the same CORESET pool ID. The CORESET pool ID is an indication of TRP.

Of course, in the above examples, the circuitry included in the processors of FIGS. 17, 18, 20, 21, 27, 28, 31, 32 is merely provided as an example, and other means for carrying out the described functions may be included within various aspects of the present disclosure, including but not limited to the instructions stored in the computer-readable storage media FIGS. 17, 18, 20, 21, 27, 28, 31, 32, or any other suitable apparatus or means described in any one of the figures and utilizing, for example, the processes and/or algorithms described herein in relation to the figures.

The following provides an overview of examples of the present disclosure.

Example 1: an apparatus for wireless communication, comprising: a memory; and at least one processor coupled to the memory and configured to: receive scheduling information that schedules a Channel State Information Reference Signal (CSI-RS) from a base station; determine whether to autonomously update a Transmission Configuration Indicator (TCI) state in response to the scheduled CSI-RS; update the TCI state autonomously in response to a determination to autonomously update the TCI state; and update the TCI state only in response to TCI state update instructions received from the base station following a determination not to autonomously update the TCI state.

Example 2: the apparatus of example 1, wherein the at least one processor is further configured to determine whether to autonomously update the TCI state based on whether an acknowledgment (ACK) is received from the base station in response to a CSI report transmitted from the apparatus to the base station.

Example 3: the apparatus of examples 1 or 2, wherein the at least one processor is further configured to transmit the CSI report within one of a physical uplink shared channel (PUSCH) or a physical uplink control channel (PUCCH).

Example 4: the apparatus of examples, 1, 2 or 3, wherein the at least one processor is further configured to transmit the CSI report within a PUSCH, and wherein the ACK is configured to schedule a new transmission using a same hybrid automatic repeat request (HARQ) identifier (ID) as the PUSCH carrying the CSI report.

Example 5: the apparatus of examples 1, 2, 3, or 4, wherein the at least one processor is further configured to autonomously update the TCI state following a predetermined delay time after receiving the ACK.

Example 6: the apparatus of example 1, wherein the at least one processor is further configured to determine whether to autonomously update based on an indicator received from the base station indicating whether the apparatus is permitted to autonomously update the TCI state.

Example 7: the apparatus of example 6, wherein the at least one processor is further configured to receive the indicator from the base station within a CSI-RS report configuration message.

Example 8: the apparatus of example 1, wherein the at least one processor is further configured to determine whether to autonomously update the TCI state by comparing a metric based on a measurement of the CSI-RS to a power threshold.

Example 9: the apparatus of example 1, wherein the at least one processor is further configured to determine whether to autonomously update the TCI state by determining a difference between a metric based on a measurement of the CSI-RS and a current physical downlink shared channel (PDSCH) power level and comparing the difference to a power difference threshold.

Example 10: the apparatus of example 1, wherein the at least one processor is further configured to determine whether to autonomously update the TCI state based on a type of CSI report scheduled by the base station.

Example 11: the apparatus of examples 1, 2, 3, 4, 5, 6, 7, 8, 9, or 10, wherein the at least one processor is further configured to perform an autonomous update for aperiodic (AP) or semi-persistent (SP) CSI-RS operations but not for periodic (P) CSI-RS operations.

Example 12: the apparatus of examples 1, 2, 3, 4, 5, 6, 7, 8, 9, 10, or 11, wherein the at least one processor is further configured to report the autonomous update to the base station using a CSI report that includes at least an indication of the TCI state and an associated measured metric.

Example 13: the apparatus of example 12, wherein the at least one processor is further configured to report the autonomous update by replacing a top K number of TCI states in the CSI report that are not currently configured with corresponding updated TCI states.

Example 14: the apparatus of example 12, wherein the at least one processor is further configured to report the autonomous update by replacing TCI states that are not currently configured and are among a top K number of TCI states in the CSI report with corresponding updated TCI states.

Example 15: the apparatus of example 12, wherein the at least one processor is further configured to report the autonomous update by appending a qualified updated TCI in a TCI state list when the apparatus is configured with fewer than a maximum number (N) of configurable TCI states.

Example 16: a method of wireless communication at a UE, the method comprising: receiving scheduling information from a base station that schedules a Channel State Information Reference Signal (CSI-RS); determining whether to autonomously update a Transmission Configuration Indicator (TCI) state in response to the scheduled CSI-RS; in response to a determination to autonomously update the TCI state, updating the TCI state autonomously; and in response to a determination not to autonomously update the TCI state, updating the TCI state only in response to TCI state update instructions received from the base station.

Example 17: the method of example 16, wherein determining whether to autonomously update the TCI state comprises receiving an indicator from the base station indicating whether the UE is permitted to autonomously update the TCI state.

Example 18: the method of example 16, wherein determining whether to autonomously update the TCI state comprises comparing a metric based on a measurement of the CSI-RS to a power threshold.

Example 19: the method of example 16, wherein determining whether to autonomously update the TCI state comprises determining a difference between a metric based on a measurement of the CSI-RS and a current physical downlink shared channel (PDSCH) power level and comparing the difference to a power difference threshold.

Example 20: the method of example 16, wherein determining whether to autonomously update the TCI state is based on whether an acknowledgment (ACK) is received from the base station in response to a CSI report transmitted from the UE to the base station.

Example 21: an apparatus for wireless communication, comprising: a memory; and at least one processor coupled to the memory and configured to: transmit scheduling information to a user equipment (UE) that schedules a Channel State Information Reference Signal (CSI-RS); receive an autonomously updated Transmission Configuration Indicator (TCI) state from the UE if the apparatus permits the UE to autonomously update the TCI state; and transmit TCI state update instructions to the UE if the apparatus does not permit the UE to autonomously update the TCI state.

Example 22, the apparatus of example 21, wherein the at least one processor is further configured to transmit a notification to the UE that the UE is permitted to autonomously update the TCI state, wherein the notification is provided within an indicator that schedules a CSI report.

Example 23, the apparatus of examples 21 or 22, wherein the at least one processor is further configured to transmit a notification to the UE that the UE is permitted to perform an autonomous update for aperiodic (AP) or semi-persistent (SP) CSI-RS operations but not for periodic (P) CSI-RS operations.

Example 24, the apparatus of examples 21, 22, or 23, wherein the at least one processor is further configured to receive a CSI report from the UE of an autonomous update made by the UE, wherein the CSI report includes at least an indication of the autonomously updated TCI state and an associated measured metric.

Example 25, the apparatus of example 24, wherein the CSI report further includes an indication for each of a plurality of TCIs indicating whether each TCIs is updated by the UE.

Example 26, an apparatus for wireless communication, comprising: a memory; and at least one processor coupled to the memory and configured to: receive scheduling information from a multiple transmission and reception point (mTRP) base station that schedules a Channel State Information Reference Signal (CSI-RS); and autonomously update Transmission Configuration Indicator (TCI) states for use with the mTRP base station.

Example 27, the apparatus of example 26, wherein the scheduling information from the mTRP base station schedules the apparatus to report based on the CSI-RS using a CSI-RS report, and wherein the processor is further configured to report at least one group of two TCIs to the mTRP base station within a CSI report, wherein each TCI is associated with a different TRP of the mTRP base station.

Example 28, the apparatus of example 27, wherein the at least one processor is further configured to report the at least one group of two TCIs by autonomously replacing K groups of TCI states corresponding to a particular TCI codepoint in a current physical downlink shared channel (PDSCH) configuration, wherein the top K groups of the TCI states are replaced following selection based on predefined rules or a base station configuration.

Example 29, the apparatus of example 27, wherein the at least one processor is further configured to autonomously update the TCI states by reporting K TCIs to the mTRP base station and replacing the TCIs in a current physical downlink shared channel (PDSCH) configuration along with a corresponding coreset pool identifier (ID).

Example 30, the apparatus of example 26, 27, 28, or 29, wherein the scheduling information received from the mTRP base station schedules multiple CSI-RSs for the apparatus to measure, and wherein corresponding TCI states for CSI-RS resource sets correspond to beams from different TRPs of the mTRP base station, and wherein the processor is further configured to identify an indication of an associated TRP for each of the CSI-RS resource sets based on a configuration of the CSI-RS resource set.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
   a memory; and
   at least one processor coupled to the memory and configured to:
     receive scheduling information that schedules a Channel State Information Reference Signal (CSI-RS) from a base station;
     transmit a CSI report to the base station;
     determine whether an acknowledgment (ACK) is received from the base station in response to the CSI report;
     in response to a determination that an ACK has been received, update a Transmission Configuration Indicator (TCI) state autonomously without receiving TCI state update instructions from the base station; and
     in response to a determination that an ACK has not been received, wait until TCI state update instructions are received from the base station and then update the TCI state in response to the TCI state update instructions.

2. The apparatus of claim 1, wherein the at least one processor is further configured to transmit the CSI report within one of a physical uplink shared channel (PUSCH) or a physical uplink control channel (PUCCH).

3. The apparatus of claim 1, wherein the at least one processor is further configured to transmit the CSI report within a PUSCH, and wherein the ACK is configured to schedule a new transmission using a same hybrid automatic repeat request (HARQ) identifier (ID) as the PUSCH carrying the CSI report.

4. The apparatus of claim 1, wherein the at least one processor is further configured to autonomously update the TCI state following a predetermined delay time after receiving the ACK.

5. The apparatus of claim 1, wherein the at least one processor is further configured to determine whether to autonomously update based on an indicator received from the base station indicating whether the apparatus is permitted to autonomously update the TCI state.

6. The apparatus of claim 5, wherein the at least one processor is further configured to receive the indicator from the base station within a CSI-RS report configuration message.

7. The apparatus of claim 1, wherein the at least one processor is further configured to determine whether to autonomously update the TCI state by comparing a metric based on a measurement of the CSI-RS to a power threshold.

8. The apparatus of claim 1, wherein the at least one processor is further configured to determine whether to autonomously update the TCI state by determining a difference between a metric based on a measurement of the CSI-RS and a current physical downlink shared channel (PDSCH) power level and comparing the difference to a power difference threshold.

9. The apparatus of claim 1, wherein the at least one processor is further configured to determine whether to autonomously update the TCI state based on a type of CSI report scheduled by the base station.

10. The apparatus of claim 9, wherein the at least one processor is further configured to perform an autonomous update for aperiodic (AP) or semi-persistent (SP) CSI-RS operations but not for periodic (P) CSI-RS operations.

11. The apparatus of claim 1, wherein the at least one processor is further configured to report the autonomous update to the base station using a CSI report that includes at least an indication of the TCI state and an associated measured metric.

12. The apparatus of claim 11, wherein the at least one processor is further configured to report the autonomous update by replacing a top K number of TCI states in the CSI report that are not currently configured with corresponding updated TCI states.

13. The apparatus of claim 11, wherein the at least one processor is further configured to report the autonomous update by replacing TCI states that are not currently configured and are among a top K number of TCI states in the CSI report with corresponding updated TCI states.

14. The apparatus of claim 11, wherein the at least one processor is further configured to report the autonomous update by appending a qualified updated TCI in a TCI state list when the apparatus is configured with fewer than a maximum number (N) of configurable TCI states.

15. The apparatus of claim 1, wherein the at least one processor is further configured to determine whether to update the TCI state, in response to the determination that an ACK has not been received, based on a payload size of the CSI report transmitted from the apparatus to the base station.

16. The apparatus of claim 1, wherein the at least one processor is further configured, in response to the determination that an ACK has not been received, to update the TCI state only in response to received TCI state update instructions.

17. A method of wireless communication at a user equipment (UE), the method comprising:
receiving scheduling information from a base station that schedules a Channel State Information Reference Signal (CSI-RS);
transmitting a CSI report to the base station;
determining whether an acknowledgment (ACK) is received from the base station in response to the CSI report;
in response to a determination that an ACK has been received, updating a Transmission Configuration Indicator (TCI) state autonomously without receiving TCI state update instructions from the base station;
in response to a determination that an ACK has not been received, waiting until TCI state update instructions are received from the base station and then updating the TCI state in response to the TCI state update instructions received from the base station.

18. The method of claim 17, wherein determining whether to autonomously update the TCI state comprises comparing a metric based on a measurement of the CSI-RS to a power threshold.

19. The method of claim 17, wherein determining whether to autonomously update the TCI state comprises determining a difference between a metric based on a measurement of the CSI-RS and a current physical downlink shared channel (PDSCH) power level and comparing the difference to a power difference threshold.

20. The method of claim 17, further comprising determining whether to update the TCI state, in response to the determination that an ACK has not been received, based on a payload size of the CSI report transmitted from the apparatus to the base station.

* * * * *